US007896356B2

(12) United States Patent
Zhou et al.

(10) Patent No.: US 7,896,356 B2
(45) Date of Patent: Mar. 1, 2011

(54) DRILL CHUCK WITH TWO-STAGE GRIPPING

(75) Inventors: Zexin Zhou, Shanghai (CN); Guijie Li, Shandong Province (CN)

(73) Assignee: Shandong Weida Machinery Co., Ltd., Wendeng, Shandong Providence (CN)

( * ) Notice: Subject to any disclaimer, the term of this patent is extended or adjusted under 35 U.S.C. 154(b) by 999 days.

(21) Appl. No.: 11/732,943

(22) Filed: Apr. 5, 2007

(65) Prior Publication Data

US 2007/0241519 A1 Oct. 18, 2007

(30) Foreign Application Priority Data

Apr. 10, 2006 (CN) .......................... 2006 1 0074446
Nov. 1, 2006 (CN) ..................... 2006 2 0158015 U

(51) Int. Cl.
*B23B 31/16* (2006.01)

(52) U.S. Cl. .......................... 279/62; 279/140; 279/902

(58) Field of Classification Search ............ 279/60–65, 279/140, 902; *B23B 31/16*
See application file for complete search history.

(56) References Cited

U.S. PATENT DOCUMENTS

| 1,357,935 | A | * | 11/1920 | Argetsinger | 81/115 |
| 2,240,556 | A | * | 5/1941 | Eide | 81/111 |
| 3,970,323 | A | * | 7/1976 | Schnizler, Jr. | 279/64 |
| 4,213,623 | A | * | 7/1980 | Rohm | 279/140 |
| 4,260,169 | A | * | 4/1981 | Hall | 279/62 |
| 4,302,021 | A | * | 11/1981 | Rohm | 279/60 |
| 4,398,733 | A | * | 8/1983 | Mosley, Jr. | 279/127 |
| 4,456,271 | A | * | 6/1984 | Kern et al. | 279/91 |
| 4,695,065 | A | * | 9/1987 | Komatsu et al. | 279/60 |
| 5,031,925 | A | | 7/1991 | Tatsu et al. | |
| 5,172,923 | A | * | 12/1992 | Nakamura | 279/62 |
| 5,232,230 | A | * | 8/1993 | Lin | 279/62 |
| 5,435,578 | A | * | 7/1995 | Rohm | 279/62 |
| 5,499,830 | A | * | 3/1996 | Schnizler | 279/62 |
| 7,503,565 | B2 | * | 3/2009 | Rohm | 279/60 |
| 7,556,269 | B2 | * | 7/2009 | Cachod | 279/63 |

(Continued)

FOREIGN PATENT DOCUMENTS

CN 2059607 U 7/1990

(Continued)

*Primary Examiner*—Eric A Gates
(74) *Attorney, Agent, or Firm*—Hoffmann & Baron, LLP

(57) ABSTRACT

The present invention discloses a chuck mounted on a transmission shaft driven by a power source, and the chuck comprises a chuck body, plural jaws, a rear cap, an outer sleeve rotatablely fitted around the chuck body and located in front of the rear cap, and a transmission nut, characterized in that the chuck further comprises a drive pendulum support sleeve which is located between the outer sleeve and the transmission nut, connected with the outer sleeve and fitted around the chuck body; and a drive pendulum which is mounted on the drive pendulum support sleeve, swings between a first and second positions about its pivot axis, and has first and second drive portions, wherein the drive pendulum drives the transmission nut along a first transmission path through the first drive portion when it is in the first position, and drives the transmission nut along a second transmission path of more gripping force than the first transmission path through the second drive portion when it is in the second position. The present invention can provide greater gripping force, and is simple in structure and convenient in control.

32 Claims, 11 Drawing Sheets

U.S. PATENT DOCUMENTS

| | | | |
|---|---|---|---|
| 7,690,658 B2 * | 4/2010 | Puzio et al. | 279/60 |
| 7,726,663 B2 * | 6/2010 | Mack et al. | 279/60 |
| 7,726,917 B2 * | 6/2010 | Mack | 408/124 |
| 2007/0069484 A1 * | 3/2007 | Bordeianu | 279/62 |
| 2008/0217869 A1 * | 9/2008 | Mack | 279/62 |
| 2010/0207336 A1 * | 8/2010 | Mack | 279/60 |

FOREIGN PATENT DOCUMENTS

| | | | |
|---|---|---|---|
| CN | 1053206 | | 7/1991 |
| CN | 2480087 Y | | 3/2002 |
| CN | 2671723 Y | | 1/2005 |
| CN | 1575921 | | 2/2005 |
| DE | 3713457 C1 | * | 9/1988 |
| JP | 02172605 A | * | 7/1990 |
| JP | 03049808 A | * | 3/1991 |
| WO | WO 02/100583 A1 | | 12/2002 |

* cited by examiner

DRILL CHUCK WITH TWO-STAGE GRIPPING

TECHNICAL FIELD

The present invention relates to a chuck, more particularly, to a chuck with two-stage gripping which has a first transmission path and a second transmission path and can grip a tool in a way of two-stage gripping.

BACKGROUND ART

A chuck for rotary tools in prior art, for example a drill chuck, generally includes a chuck body, a jaw, a nut, a bearing, an anti-loosening unit and an outer sleeve, wherein the chuck body is connected to a transmission spindle of a driving device, three jaws are respectively mounted in three inclined holes equally arranged in the chuck body, the jaw is provided with thread to form thread transmission together with the nut. When the outer sleeve connected to the nut is rotated, the jaws can be moved with respect to the chuck body so as to grip or release a tool handle.

In the above structure, due to the large contact stress produced by the thread between the jaws and the nut under operating load, the friction force of relative sliding therebetween is great. As a result, the gripping force to grip a tool handle, produced by the thread transmission between the nut and the jaws, tends not to be great enough, such that the jaws can not grip stably the tool handle under the operating condition of great load and vibration. In addition, several disclosed anti-loosening structures are not effective in anti-loosening owing to the limits in their structures, for example, the structure in PCT/CN02/00375 has problems such as loosening under the operating condition of vibration and impact.

Aiming to improve the locking performance of a chuck and prevent jaws from loosening in operation, many chucks with anti-loosening function have been developed, for example, a chuck for rotary tools is disclosed in U.S. Pat. No. 5,031,925. The chuck comprises a chuck body, a rear cap, three jaws, an outer sleeve, a pawl seat, a pawl and a control member, wherein the rear end of the chuck body is connected to a transmission shaft of a driving device. The rear cap is fixedly provided on the rear end of said chuck body. The outer sleeve is rotatablely fitted around the chuck body and located in front of the rear cap. The inner side of the outer sleeve is connected with the control member and drives it. The control member presses down the rear end of the pawl member such that the pawls on the front end of the pawl member are disengaged from the ratchets provided on the chuck body. In such a chuck, the pawls of the pawl member engage with the ratchets when the pawl member is in an operating condition. When the gripped tool handle needs to be released, the pawls should disengage from the ratchets completely in advance.

Chinese patent publication CN 2059607 discloses a chuck capable of moving jaws speedily and used as an accessory of a lathe, wherein the structure of the chuck includes jaws, chuck screw, a chuck body, a bevel gear, a medi wheel axle, a medi-gear and an inner ring gear, etc., and the outer edge of the chuck screw shaped a cylinder gear. The chuck keeps the function of the existing chuck of moving the jaws slowly and additionally has the function of moving the jaws speedily.

Chinese patent publication CN 2671723 discloses a multi functional precision boring head used as an accessory of a lathe, and its structure is as follows: a boring head body being provided on the bottom portion of an spindle, a slider being mounted in a chute below the boring head body, a deceleration transmission mechanism being provided in the boring head body, a differential ring gear being, against the step of the spindle, fitted around the spindle idly, the inner ring gear of the differential ring gear engaging with the upper part of a planet gear while the lower part of the planet gear engaging with the upper part of the inner ring gear of an adjusting ring, the adjusting ring having modulus internal thread at the lower part and engaging with one gear; and this gear drives another gear which engages with a rack below the latter, and the rack being fixed with the slider as one piece. Such a multi functional precision boring head structure, as mounted on a milling machine and a drilling machine, can implement both the boring and processing of an end face of a work piece.

Chinese patent publication CN 2480087 discloses a locking drill chuck, comprising a drill body, jaws, a nut, a front sleeve, and a rear sleeve. Three jaws are mounted respectively in three inclined holes arranged equally in the drill body, the nut engages with the jaws mounted in the inclined holes of the drill body, a locking control ring is provided between the front and rear sleeves, a gear is provided between the thrust surface of the drill body and the nut, and a ring drive member is fixedly connected between the nut and the front sleeve and engages with the locking control ring.

Chinese patent publication CN 1575921 discloses a device for positioning a tool with respect to a work piece, comprising a first bracket rotatable about a first axis and a second bracket rotatable about a second axis formed by the first bracket and carried by the first bracket. The second axis is parallel with the first axis and forms an eccentricity relationship with respect to the first axis. The tool seat is fixed on the second bracket in an eccentricity relationship with respect to the second axis. A drive mechanism selectively drives, in a rotary form, the first bracket about the first axis and the second bracket about the second axis, so as to selectively position the chuck for tools. Along a predetermined path, a tool secured in the chuck for tools may move with respect to the work piece.

Chinese patent publication CN1053206 discloses a keyless chuck of a non-impact type applicable to manual and electrical drivers, comprising a chuck body with a rotatable bisect nut which has relatively fine thread thereon. The chuck further comprises a set of identical slideable jaws driven by the rotatable nut. An anti-friction bearing is provided between a bearing thrust ring and the rotatable nut mounted on the chuck body. A clutch or a torque limit mechanism is used for limiting the gripping torque at a predetermined value and the releasing torque may or may not be limited. The from and rear sleeves may be made of engineering plastic materials to reduce manufacturing cost. A relatively soft elastic gripping sleeve may be provided over the front sleeve to improve the gripping performance during the gripping and releasing of the chuck and have the tool griped and centered temporarily.

A chuck or a similar gripping device has been improved in many aspects by the above-mentioned prior arts and obtained the corresponding effects. However, all of the above chucks and gripping devices perform the gripping in only one way, such that it is difficult to obtain greater gripping force. In addition, those chucks in prior art also have such problems as the locking is not reliable enough and the structure is relatively complicated.

SUMMARY OF THE INVENTION

An object of the present invention is to provide a two-stage gripping chuck capable of providing greater gripping force, aiming to the disadvantages in the prior art.

Another object of the present invention is to provide a chuck capable of more effectively preventing a tool from being loosened under an operating condition of vibration.

Another object of the present invention is to provide a chuck capable of providing multiple designed gripping forces.

To address the above technical problems, a chuck presented by the present invention is installed on a transmission shaft driven by a power source. Said chuck comprises a chuck body having a longitudinal central axis and connected at its rear end to the transmission shaft to drive the chuck body to rotate about the central axis; plural jaws provided in inclined holes of the chuck body and having male thread on the rear end and a gripping portion on the front end, wherein the jaws slide back and forth in the inclined holes through the thread transmission so as to grip and release a tool handle; an outer sleeve rotatablely fitted around the chuck body; and a transmission nut fitted around the chuck body and connected indirectly to the outer sleeve, wherein the transmission nut can be driven through rotating the outer sleeve and has female thread in its inner surface to cooperate with the male thread of the jaws so as to drive the jaws, characterized in that it further comprises a drive pendulum support sleeve, located between the outer sleeve and the transmission nut, connected to the outer sleeve and fitted around the chuck body; a drive pendulum provided on the drive pendulum support sleeve and swinging between a first position and a second position about the connection portion of the drive pendulum to the drive pendulum support sleeve. The drive pendulum has a first drive portion and a second drive portion thereon which drive the transmission nut along the first transmission path through a first drive key when the drive pendulum in the first position, while drive the transmission nut along a second transmission path through a second drive key when the same is in the second position with the second transmission path providing greater gripping force than that of the first transmission path.

According to a first aspect of the present invention, the first and second drive portions are the first and second drive keys respectively and the drive pendulum swings in a plane perpendicular to the longitudinal central axis.

Further, the chuck comprises a nut transmission sleeve which is fixedly connected at its upper end to the transmission nut and provided at its lower end with a drive groove, wherein the first drive key of the drive pendulum is connected drivable with the drive groove of the nut transmission sleeve such that the drive pendulum drives the transmission nut along the first path.

Further, the side surface of the first drive key, which engages with the drive groove of the nut transmission sleeve in the gripping rotating direction, is inclined, such that when the first drive key engages with the drive groove and drives the nut transmission sleeve, the corresponding side surface of the drive groove applies a component force to the drive pendulum toward the second position.

Further, the chuck comprise a gear sleeve which is mounted between the chuck body and the drive pendulum support sleeve and has a first gear teeth part and a second gear teeth part; a teething-ring connection sleeve which is fixedly connected at one end to the chuck body and has an inner teething-ring portion at the other end, wherein the inner teething-ring portion has inner gear teeth thereon; and at least one planet gear which is rotatablely provided on the nut transmission sleeve and located between the first gear teeth portion of the gear sleeve and the inner teething-ring portion of the teething-ring connection sleeve, and engaging with the two respectively; wherein the second drive key engages with the second gear teeth part of the gear sleeve when the drive pendulum is at the second position such that the dive pendulum drives the transmission nut along the second path.

Further, the drive pendulum support sleeve is provided with an elastic member which abuts against the inner side of the drive pendulum so as to bias the drive pendulum outward in radial direction.

Further, the nut transmission sleeve is provided on its inner surface with one or more position grooves such that the first drive key may slide into the position groove when the drive pendulum in the second position urges the gear sleeve to rotate.

Further, the nut transmission sleeve is provided with a stop portion which is located between the position groove and the drive groove, preventing the first drive key of the drive pendulum from passing over the position groove and entering the drive groove during the gripping of the chuck.

According to a second aspect of the present invention, a chuck is provided. The difference between the chuck and that according to the first aspect lies in that the nut transmission sleeve includes a nut sleeve and a transmission sleeve which are provided separately and connected together.

Further, the nut sleeve is fixedly fitted around the nut at its upper portion and provided at its lower portion with a groove. The transmission sleeve is provided with an upper shaft support portion and a lower shaft support portion for mounting a planet gear shaft supporting the planet gear, wherein the upper shaft support portion is an upper shaft support arm extending outward in radial direction, and the upper shaft support arm cooperates with the drive groove on the nut sleeve drivable.

Further, the transmission sleeve forms at its lower part a skirt portion, the top wall of which is used as the lower shaft support portion corresponding to the upper shaft support portion.

Further, the teething-ring connection sleeve includes a teeth-ring sleeve and an inner teething-ring provided separately, wherein the teething-ring is fixedly mounted at its upper end on the chuck body and is mounted at its lower end with the inner teething-ring at a position corresponding to the planet gear, and the inner surface of the inner teething-ring has inner gear teeth.

According to a third aspect of the present invention, a chuck is provided, wherein the first and second drive portions are the first and second drive keys respectively, and the drive pendulum swings in a vertical plane parallel with the longitudinal central axis.

Further, the chuck comprises a nut transmission sleeve which includes a nut sleeve and a transmission sleeve connected with each other. The nut sleeve is fixedly connected at its upper end to the transmission nut and the transmission sleeve is provided at its lower end with a drive groove, such that when the drive pendulum is at the first position, the first drive key of the drive pendulum is connected with the drive groove of the nut transmission sleeve, causing the drive pendulum to drive the transmission nut along the first path.

Further, the side surface of the first drive key of the drive pendulum, which engages with the drive groove of the nut transmission sleeve, is inclined, such that when the first drive key engages with the drive groove and drives the nut transmission sleeve, the corresponding side surface of the drive groove applies a component force to the drive pendulum toward the second position.

Further, the chuck comprise a gear sleeve which is mounted between the chuck body and the drive pendulum support sleeve and has a first gear teeth part and a second gear teeth part; a teething-ring connection sleeve which is fixedly connected at one end to the chuck body and has an inner teething-ring portion at the other end; and at least one planet gear which is rotatablely provided on the transmission sleeve and located between the first gear teeth portion of the gear sleeve and the inner teething-ring portion of the teething-ring connection sleeve, engaging with the two respectively; wherein the second drive key engages with the second gear teeth part of the gear sleeve when the drive pendulum is at the second position, such that the drive pendulum drives the transmission nut along the second path.

Further, the drive pendulum is an elastic portion formed integrally on the drive pendulum support sleeve, wherein the drive pendulum support sleeve has at least one drive pendulum thereon.

Further, the drive pendulum has at its free end a first drive key formed by bending upward and a second drive key formed by bending downward.

Further, the drive pendulum support sleeve also has at least one elastic support portion extending axially downward which abuts against one surface of the gear sleeve and is used for moving the drive pendulum support sleeve upward axially with respect to the gear sleeve and restoring it.

Further, the lower surface of the transmission sleeve also is provided with one or more position grooves such that the first drive key can slide into the position groove when the drive pendulum in the second position urges the gear sleeve to rotate.

Further, the transmission sleeve is also provided with a stop portion which is located between the position groove and the drive groove and prevents the first drive key of the drive pendulum from passing over the position groove and entering the drive groove during the gripping of the chuck.

Further, the chuck body is mounted with a spring check ring which is positioned in front of the gear sleeve and provided with an anti-friction assembly in the middle.

Alternatively, the drive pendulum is integrally formed at one end with the drive pendulum support sleeve, and the other end of the same is a free end on which the first and second drive portions are formed.

Alternatively, the drive pendulums are removably mounted on the drive pendulum support sleeve, the first drive portion is the first drive key provided on the outer side of the drive pendulum, and the second drive portion is the second drive key provided on the inner side of the drive pendulum, wherein the drive pendulum has a connecting groove, and the drive pendulum support sleeve has a connecting key connected with the connecting groove of the drive pendulum, wherein the drive pendulum support sleeve further has an elastic portion, the free end of which biases outward against the free end of the corresponding drive pendulum.

The advantages of the present invention are as follows:

The first and second drive keys are provided on both sides of the drive pendulum respectively, wherein the first drive key urges the chuck to perform gripping in a first stage along the first path, and after the first stage gripping, the second drive key urges the chuck to perform gripping of greater force in a second stage along the second path. In this way, the chuck can provide greater gripping force through the two-stage gripping.

The transfer of the force along two paths is achieved through two drive keys of a single drive pendulum, which is simple in structure and convenient in operation.

After the gripping in the second stage, the first drive key of the drive per pendulum can slide into the position groove of the transmission sleeve fixedly connected with the chuck body, ensuring that the chuck is capable of preventing the nut from rotating reversely under the operating condition of vibration, so as to prevent the loosening of the tool handle.

The plural position grooves of the transmission sleeve can provide various gripping forces in design to the chuck for accommodating the various working conditions.

BRIEF DESCRIPTION OF THE DRAWINGS

The above and other objects and features of the present invention will be more clearly understood from the detailed description of preferable embodiments of the present invention taken in conjunction with accompanying figures, in which the same components are throughout denoted by same reference numbers and some components in figures are omitted for clarity, wherein.

The explanation of reference numbers:

| | |
|---|---|
| 01 chuck body | 011 inclined hole |
| 012 serration | 02 jaw |
| 03 nut | 031 serration |
| 04 bearing | 05 outer sleeve |
| 051 slot | 06 front cover |
| 07 rear cap | 08 teething-ring connection sleeve |
| 081 inner gear teeth | 082 punch rivet point |
| 09 nut transmission sleeve | 091 punch rivet portion |
| 092 drive groove | 093a/093e position groove |
| 094 stop portion | 095/096 shaft support arm |
| 097 planet gear window | 098/099 shaft mounting hole |
| 10 planet gear | 11 planet gear shaft |
| 12 gear sleeve | 121 first gear teeth part |
| 122 second gear teeth part | 123 position stop plate |
| 13 drive pendulum support sleeve | 131 elastic portion |
| 132 bearer key | 133 shaft support arm |
| 134/135 shaft mounting hole | 14a/14b first drive pendulum |
| 141 first drive key | 142 second drive key |
| 143 shaft mounting hole | 15 drive pendulum shaft |
| 16 spring check ring | 17 spring check ring |
| 18 teething-ring sleeve | 181 punch rivet portion |
| 182 connection key | 183 stop |
| 19 nut sleeve | 191 drive groove |
| 20 transmission sleeve | 21 inner teething-ring portion |
| 211 gear teeth | 212 key |
| 213 serration | 30 transmission sleeve |
| 304 stop portion | 321 second gear teeth portion |
| 322 rectangle notch | 323 position stop plate |
| 33 drive pendulum support sleeve | 331 drive pendulum |
| 338 elastic support portion | 35 anti-friction assembly |
| 39 nut sleeve | 391 notch |
| 61 first gear bracket | 612 keyway |
| 617 connection key | 62 second gear bracket |
| 627 connecting groove | 63 drive pendulum support sleeve |
| 634 stop key | 63' drive pendulum support sleeve |
| 65a, 65b drive pendulum | 635 connection key |
| 651 connecting groove | |

DESCRIPTION OF PREFERRED EMBODIMENTS

The chuck according to the present invention can be used for gripping machining tools such as a drill bit, a screw tap, or a reamer. The present invention will be further described in detail hereinafter in conjunction with accompanying figures. In described embodiments, same components are represented by same terms and same reference numbers, wherein the repetitive description will be omitted.

In the description, regarding the chuck itself, "the front" is where the tool handle is located while "the rear" is where the power source drive shaft is located. In the description taken in conjunction with figures, generally, "the front" is also called "the lower" and "the rear" is called "the upper", except special indication or that said expression cannot be understood.

The First Embodiment

Figure 1:
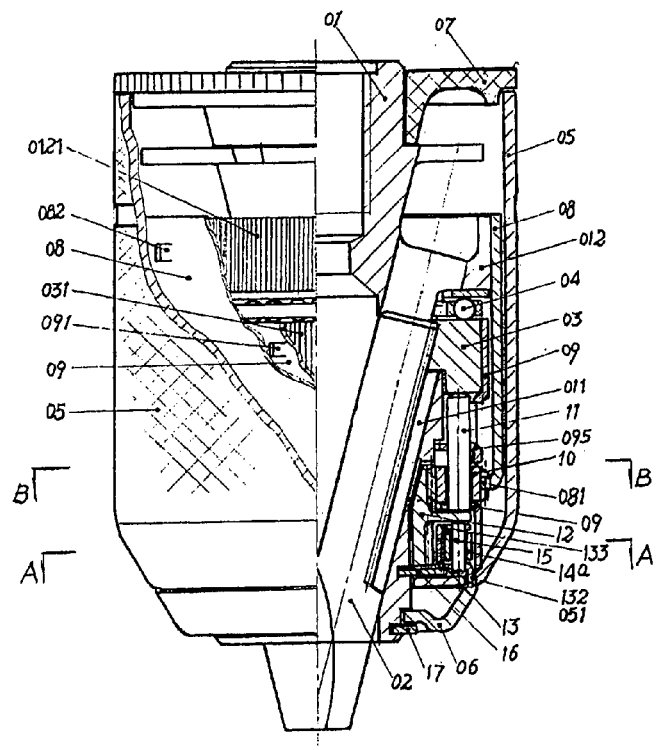
FIG. 1 is a front cross sectional view of the chuck according to the first embodiment of the present invention.

Referring to FIG. 1, the front partial cross sectional view of the first embodiment of the chuck according to the present invention is shown. The chuck comprises a chuck body 01 located in the center and having a longitudinal central axis, wherein the chuck body is connected at the rear end with a transmission shaft of a power source through a thread hole or tapering hole and forms an accommodation space for gripping a tool handle at the front end. Plural inclined holes 011 are equally arranged in the chuck body 01 about its central axis. The chuck body 01 has a bearer stage 012 on its outer surface, and the bearer stage 012 has serration 0121 on its outer surface.

In addition, the outer surface of the chuck body 01, at the front end, is formed with two annular grooves which are provided with opening spring check rings 16, 17 respectively.

Plural jaws 02 are mounted in the inclined holes 011 of the chuck body 01, wherein the jaw has partial male thread at the rear end and a gripping portion at the front end, and the gripping portion is of a substantial prism shape for gripping the tool handle.

The chuck body 01 is provided at the rear end with a rear cap 07 which is connected to the rear end of the chuck body either by a hole and a fastening member or by a key. The rear cap 07 extends radially outward at the periphery and abuts the rear end of an outer sleeve 05. Alternatively, the periphery of the rear cap 07 may further extend forward to form a holding portion.

Figure 9:
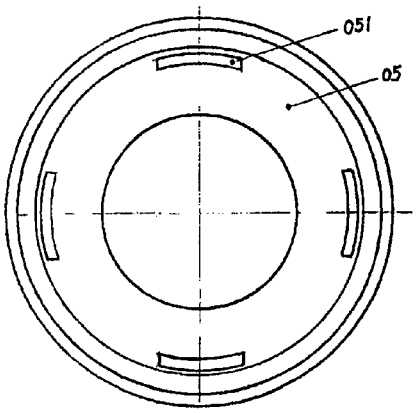
FIG. 9 is a top view of the outer sleeve.

The outer sleeve 05 is provided in front of the rear cap 07 and rotatablely fitted around the chuck body 01, wherein the rear end of the outer sleeve 05 is closed by the rear cap 07. Referring to FIG. 9, the outer sleeve 05 is shown in top view. The outer surface of the outer sleeve 05 forms a holding portion on which net thread or stripe facilitating the holding can be provided. The lower end of the outer sleeve 05 extends radially inward to form a flange on which plural circumferentially arranged slots 051 are formed.

A nut 03 is externally fitted around the chuck body and located in front of the bearer stage 012 of the chuck body, wherein a bearing 04 is provided between the nut 03 and the bearer stage 012. The nut 03 has thread drive relationship with the jaws 2 and has serration on its outer circumferential surface.

Figure 5:
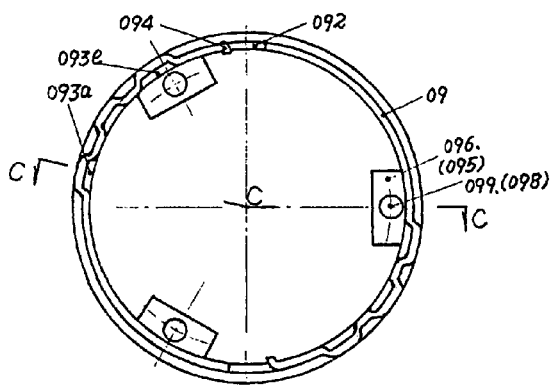
FIG. 5 is a bottom view of the nut transmission sleeve.
Figure 6:
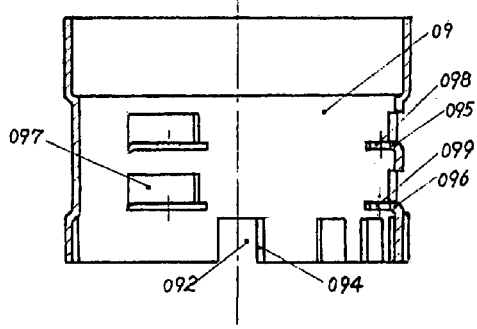
FIG. 6 is a front cross sectional view of the nut transmission sleeve.

A nut transmission sleeve 09 is also externally fitted around the chuck body, fixedly fitted at the upper end around the cylindrical outer surface 031 of the nut 03 with serration and secured by a punch rivet portion 091. Referring to FIGS. 5 and 6, the nut transmission sleeve 09, at the other end, has plural drive notches 092 and position grooves 093a-093e, and at the central part, has several pairs of shaft support arms 095 and 096 with shaft mounting holes 098 and 099 therein. As shown in FIG. 1, in the shaft mounting holes 098 and 099 of the shaft support arms are provided with planet gear shafts 11, each of which is provided thereon with a planet gear 10. The planet gear 10 partially passes through a rectangle planet gear window 097 and then extends beyond the wall of the nut transmission sleeve 09, so as to engage with an inner gear teeth 081 on an inner teething-ring part of a gear ring connection sleeve 08 which is described hereinafter.

Referring to FIGS. 5 and 6, the nut transmission sleeve 09 is also provided with a stop portion 094 which is located on the side wall portion of a drive notch 092 between the position groove (093*e*) and the drive notch 092, preventing the first drive key 141 of drive pendulums 14*a* and 14*b* from passing over the position grooves 093*a* and 093*e* and entering the drive notch 092 during the gripping of the chuck. If such a circumstance happens, the second drive key 142 will disengage from the second gear teeth part 122 of the gear sleeve 12 due to the biasing effect of the elastic portion 131 on the drive pendulums 14*a* and 14*b*.

The bearer stage 012 of the chuck body 01 is fixedly fitted around with a teething-ring connection sleeve 08 which, at the upper end, is of cylinder sleeve shape and fixed to the cylindrical outer surface of the bearer stage 012 with serration through a punch rivet portion 082, and at the lower end, has an inner teething-ring portion in the inner wall, wherein the inner teething-ring portion has inner gear teeth 081 thereon and engages with the planet gear 10.

Figure 19:
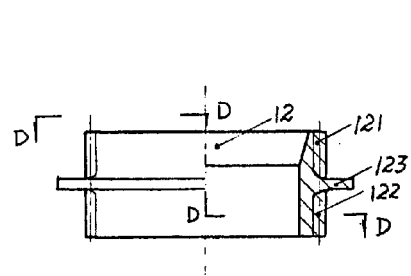
FIG. 19 is a front cross sectional view of the gear sleeve.
Figure 20:
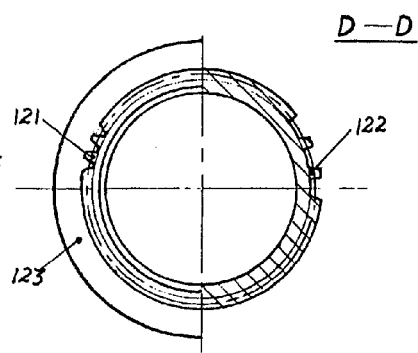
FIG. 20 is a cross sectional view of the gear sleeve of FIG. 19 taken along the line D-D.

The chuck body 01 is idly fitted around with a gear sleeve 12 at the central part close to the front part. Referring to FIGS. 19 and 20, the gear sleeve 12 has a first gear teeth part 121 at the upper end (i.e. the end closer to the central part of the chuck body) and has a second gear teeth part 122 at the other end with a position stop plate 123 provided therebetween to prevent the planet gear shaft 11 from moving radially forward. Of course, it is possible to achieve the axial position of the planet gear shaft 11 by the cooperation between a spring check ring mounted in an annular groove and the shaft support arm 095 and 096, wherein the annular groove is formed on the planet gear shaft 11.

The first gear teeth portion 121 is located to correspond radially to the planet gear 10 and engage with it, and the second gear teeth portion 122 is located to correspond radially to the second drive key 142 of drive pendulums 14*a* and 14*b* (mentioned later) and engages with it. The teeth of the first gear teeth portion 121 are typically gear teeth which have a relatively dynamic transmission relationship with the planet gear when the gear teeth are in operation, while the teeth of the second gear teeth portion 122 are engagement points functioning as keys, which have a relatively static drive relationship with the second drive key 142 when the teeth are in operation.

Figure 7:
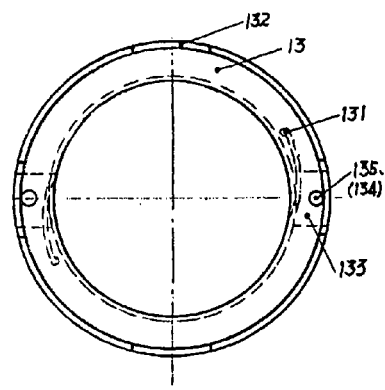
FIG. 7 is a bottom view of the drive pendulum support sleeve.
Figure 8:
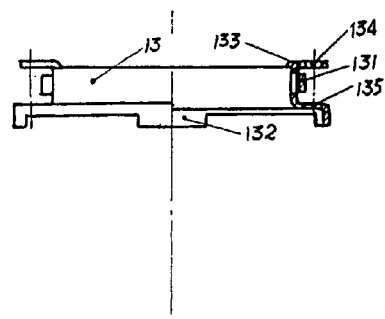
FIG. 8 is a front cross sectional view of the drive pendulum support sleeve.

The chuck body 01 is also fitted around with a drive pendulum support sleeve 13 which is located in a position corresponding to the second gear teeth portion 122 of the gear sleeve 12. Referring to FIGS. 7 and 8, the drive pendulum support sleeve 13 has at one end a shaft support arm 133 with a shaft mounting hole 134 thereon and has a dish shaped flange on the other end. The flange is formed with a shaft mounting hole 135 coaxial with the shaft mounting hole 134 and has a bearer key 132 extending toward the end portion. Plural elastic portions 131 are provided at the central part of the drive pendulum support sleeve 13. The drive pendulum support sleeve 13 is mounted between the gear sleeve 12 and the nut transmission sleeve 09 and cooperates with the inner wall of the nut transmission sleeve 09.

The drive pendulum support sleeve 13 is provided with plural drive pendulums 14*a* and 14*b*, each of which has shaft mounting hole 143 at one end and a first drive key 141 and a second drive key 142 on both sides, respectively, at the other end. The drive pendulums 14*a* and 14*b* are movable fitted to a drive pendulum shaft 15, both ends of which are fixedly mounted in shaft mounting holes 134 and 135. The drive pendulums 14*a* and 14*b* for varying force are swingable components mounted on the drive pendulum support sleeve and the elastic portion 131 radially biases the drive pendulum 14 outward. In an assembling position, the first drive keys 141 of the drive pendulums 14*a* and 14*b* engage with the drive notch 092 of the nut transmission sleeve with the drive pendulum in the first position. The side surface of the first drive key 141 of the drive pendulum, which engages with the drive notch 092 of the nut transmission sleeve 09 in the gripping direction, is inclined at a angle of β (<90°) with respect to the tangent line of the drive pendulums 14*a* and 14*b* at this point, such that when the first drive key 141 engages with the drive notch 092 and drives the nut transmission sleeve 09, the corresponding side surface of the drive notch 092 applies the component force toward the side of the second drive key 142 on the drive pendulums 14*a* and 14*b* to engage the second drive key 142 with the first gear teeth 122 of the gear sleeve 12, and the drive pendulum is in the second position at this point.

In addition, the spring check ring 16 with an opening is mounted in the annular groove at the front end of the chuck body to position axially the gear sleeve 12 and the drive pendulum support sleeve 13 on the chuck body. The outer sleeve 05 is fitted around the teething-ring connection sleeve 08 and has slots 051 at the front end to connect insertedly with the bearer key 132 of the drive pendulum support assembly 13. A front cover 06 is mounted on the front portion of the chuck body 01 and the front end of the outer sleeve 05. The elastic spring check ring 17 position axially the front cover 06 and the outer sleeve 05.

Hereinafter, the operation procedure of the first embodiment will be described in detail in conjunction with figures.

Figures 2, 3:
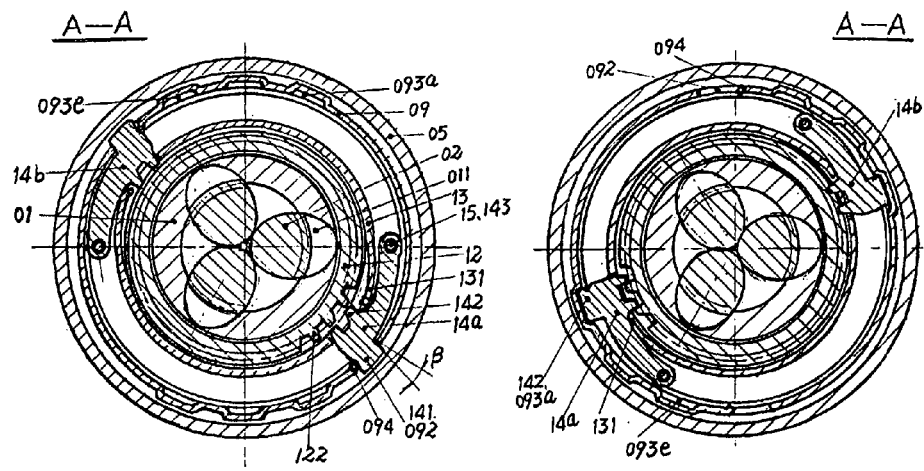
FIG. 2 is a cross sectional view taken along the line A-A in FIG. 1, wherein the chuck is in the first stage of gripping while the drive pendulum is in the first position.
FIG. 3 is a cross sectional view taken along the line A-A in FIG. 1, wherein the chuck is in the second stage of gripping while the drive pendulum is in the second position.
Figure 4:
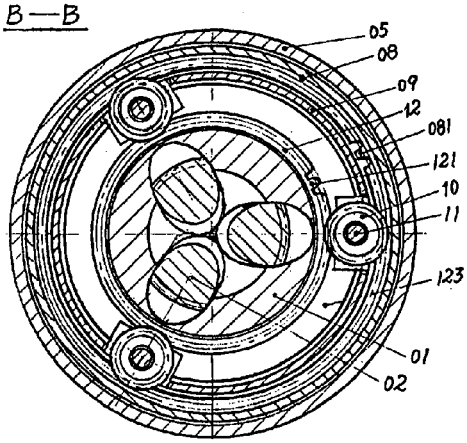
FIG. 4 is a cross sectional view taken along the line B-B in FIG. 1.

Referring to FIGS. 1-3, when the outer sleeve 05 is rotated in the clockwise direction in FIG. 2, the slot 051 urges the drive pendulum support sleeve 13 to rotate. As the result, the drive pendulum 14 on the drive pendulum support sleeve 13, under the biasing effect of the elastic portion 131, makes the first drive key 141 thereon engage with the drive notch 092 of the nut transmission sleeve 09, such that the nut transmission sleeve 09, along with the nut 03, rotates in the same direction with the outer sleeve 05, and the jaws move back and forth in the inclined holes in the chuck body by the thread transmission between the nut thread and the jaw thread to grip or release the drill handle. The positive rotation of the outer sleeve 05 causes the jaws 02 to move forward to grip the drill handle.

This is the first stage of gripping in which the transmission path is the first path. The maximum rotating torque N1 of the first stage can be set by appropriate selection of the magnitudes of the elastic force of the elastic portion 131 and the angle of β (<90°).

If the outer sleeve is further rotated with greater force, once the rotating torque is greater than N1, the drive pendulum 14 will swing about the drive pendulum shaft 15 by overcoming the elastic force of the elastic portion 131 and the friction force between the first drive key 141 and the side wall of the notch 092, such that the first drive key 141 slides out of the notch 092 and forces the second drive key 142 to engage with the second gear teeth portion 122 of the gear sleeve 12 when supported by the inner wall of the nut transmission sleeve 09 so as to enter the second stage, wherein the passed transmission path is the second path.

In the second stage of gripping, the rotating torque (i.e. the input torque of the outer sleeve 05) is magnified by the transmission of a planet gear mechanism. Through the urging of the slot 051 on the drive pendulum support sleeve 13, the drive pendulums 14a and 14b are rotated and the second drive key 142 engages with the drive gear teeth 122 of the gear sleeve 12 and at the same time, the first drive keys 141 of the drive pendulums 14a and 14b are supported by the inner wall of the nut transmission sleeve 09 and slide with respect to each other. When the drive pendulums 14a and 14b are rotated along with the drive pendulum support sleeve 13, the gear sleeve 12 is driven to rotate about the chuck body 01. The planet gear 10 engages with the gear sleeve 12 and the inner teething-ring portion of the teething-ring connection sleeve 08. Because of the fixed connection between the teething-ring connection sleeve 08 and the chuck body 01, the planet gear 10 drives both the nut transmission sleeve 09 (as the planet gear bracket) and the nut 03 to rotate together about the chuck body 01.

Since the torque transferred to the nut 03 from the gear sleeve 12 is magnified by i times through the transmission of the planet gear mechanism (the transmission ratio i of the nut transmission sleeve 09 to the gear sleeve 12 is larger than 1), the torque applied to the nut 03 is substantially equal to i times of the torque input by the outer sleeve, such that the gripping force of the jaws 02 on the drill handle is substantially i times of the gripping force of a conventional chuck.

According to the designed magnitude of the gripping force, the inner side surface of the nut transmission sleeve 09 is further, along the path in which the first drive key of the drive pendulum 14 slides, provided with plural position grooves 093a-093e. The gripping forces corresponding to the position grooves 093a-093e are sequentially increased along the circumferential direction. When the first drive key 141 slides into the corresponding position groove (the second drive key 142 is still engaging with the second gear teeth portion 122 at this point), the drill handle is applied by the gripping force which is substantially corresponding to that of the designed position. Additionally, when the first drive key 141 is located in the corresponding grooves 093a-093e, it can prevent the release of the tool handle resulted from the reverse rotation of the nut under an operating condition of vibration and impact.

When the tool handle is to be released, firstly, a relatively greater force is reversely exerted on the outer sleeve 05, making the first drive key 141 slide out from the position groove. Then the outer sleeve is further rotated to a position where the first drive key 141 is corresponding to the drive notch 092. At this point, the second drive key 142, biased by the elastic force of the spring member 131, disengages from the drive gear teeth 122 and the first drive key 141 engages with the notch 092. Herein, the tool handle can be released quickly by constant and reverse rotation of the outer sleeve.

The Second Embodiment

Figure 10:
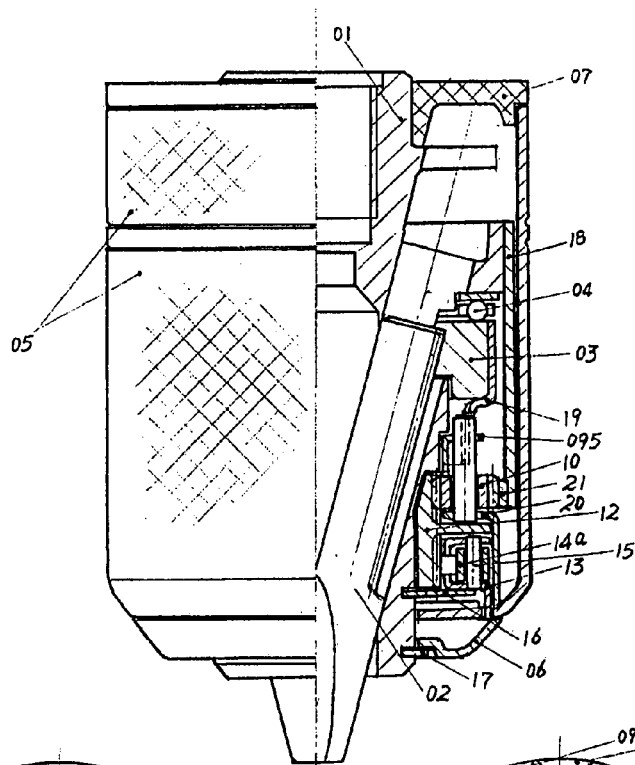
FIG. 10 is a front cross sectional view of the chuck according to the second embodiment of the present invention.

Referring to FIG. 10, the front cross sectional view of the chuck according to the second embodiment of the present invention is shown.

In the second embodiment, the combination of a nut sleeve 19 and a drive sleeve 20 is used for replacing the function of the nut transmission sleeve 09 with a one-piece structure in the first embodiment.

Figure 11:
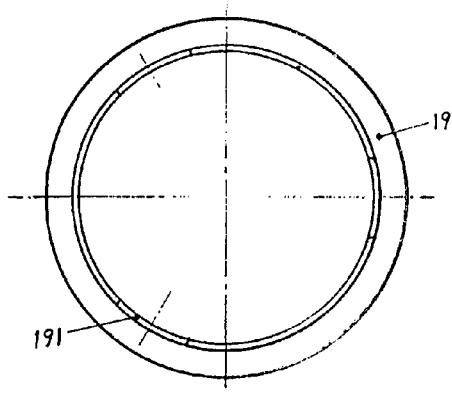
FIG. 11 is a bottom view of the nut sleeve.
Figure 14:
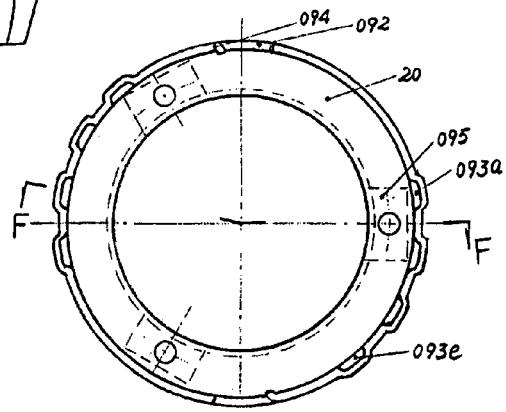
FIG. 14 is a bottom view of the transmission sleeve.
Figure 12:
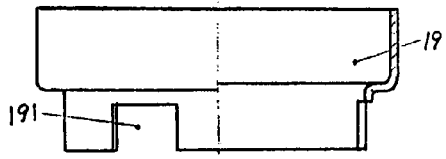
FIG. 12 is a front cross sectional view of the nut sleeve.
Figure 13:
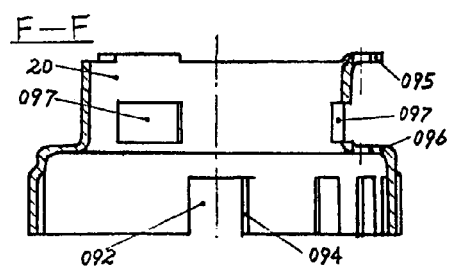
FIG. 13 is a front cross sectional view of the transmission sleeve.

The structure of the nut sleeve 19 is shown in FIGS. 11 and 12 and the structure of the transmission sleeve 20 is shown in FIGS. 13 and 14. The nut sleeve 19 forms a drive notch 191 at its lower end and the transmission sleeve 20 has a shaft support arm 095 at its upper end. The shaft support arm 095 is insertedly connected in the drive notch 191.

The nut sleeve 19 is fixedly fitted at its upper portion around the nut 03 and provided with the drive notch 191 at its lower portion. The transmission sleeve 20 is provided with upper and lower shaft support portions for mounting the planet gear shaft 11 supporting the planet gear 10. The upper shaft support portion of the transmission sleeve 20 is an upper shaft support arm 095 extending radially outward which is insertedly connected with the drive notch 191 of the nut sleeve 19 to connect the nut sleeve 19 and the transmission sleeve 20 together.

The lower portion of the transmission sleeve 20 forms a skirt portion, the top wall 096' of which, as the lower shaft support portion, is corresponding to the upper shaft support arm 095.

The transmission sleeve 20 is provided with a planet gear window 097 at the position corresponding to the planet gear 10 and is mounted on its outer side with a planet gear shaft 15, and the planet gear shaft 15 renders the planet gear 10 to partially pass through the window 097 to engage with the first gear teeth portion 121 of the gear sleeve 12.

Moreover, in the second embodiment, the combination of a teething-ring sleeve 18 and an inner teething-ring 21 assembled together is used for fulfilling the function of the teething-ring assembly sleeve in the first embodiment.

Two ways for assembling the inner teething-ring 21 and the teething ring sleeve 18 in the second embodiment are shown in figures.

Figure 16:
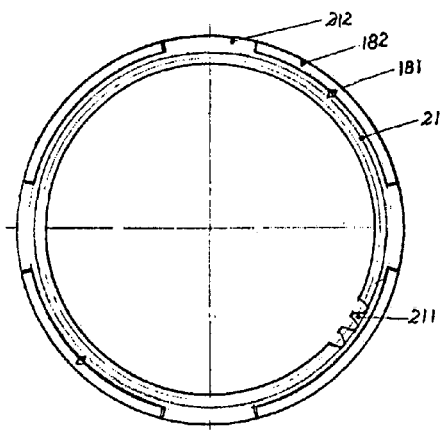
FIG. 16 is a bottom view of the teething-ring connection sleeve of FIG. 15.
Figure 15:
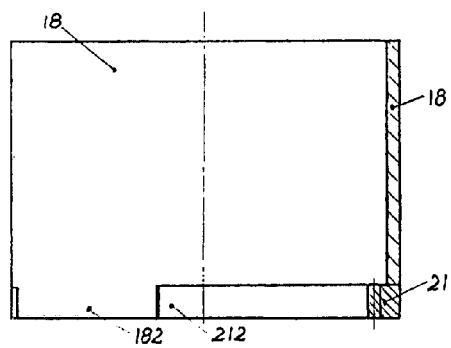
FIG. 15 is a front view of the assembly of the teething-ring connection sleeve, wherein the connection between the teething-ring sleeve and the inner teething-ring is key-groove connection.

One way is shown in FIGS. 15 and 16, in which the teething-ring connection sleeve includes the teething-ring sleeve 18 and the inner teething-ring 21 provided separately. The teething-ring sleeve 18 is fixedly mounted at its upper end on the chuck body 01 and is provided at its lower end with a connection key 182. The inner teething-ring 21 is provided at its outer periphery with keys 212 between which a groove is formed. The connection key 182 is insertedly connected with keys 212 so as to cooperate with the groove between the keys 212. Through such key-groove connection and the riveting of the punch rivet portion 181 at the connecting location, the fixed connection is achieved.

Figure 18:
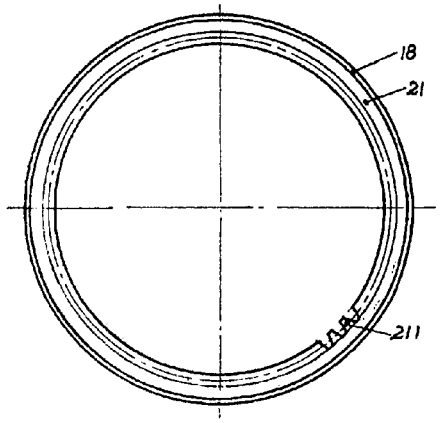
FIG. 18 is a bottom view of the teething-ring connection sleeve of FIG. 17.
Figure 17:
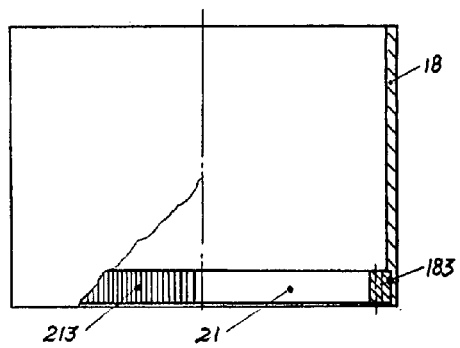
FIG. 17 is a front view of the assembly of the teething-ring connection sleeve, wherein the connection between the teething-ring sleeve and the inner teething-ring is stop interference connection.

The other way is shown in FIGS. 17 and 18, in which the teething-ring sleeve 18 is formed with an inner stop 183 at its lower end and the inner teething-ring 21 is formed with serration 213 at its outer cylindrical surface. An interference connection is formed by pressing the inner teething-ring 21 having serration 213 into the stop 183 of the teething-ring sleeve 18.

The operation of the chuck of the second embodiment is same as that of the first embodiment, the description of which is omitted.

The Third Embodiment

In the first and second embodiments described above, the drive pendulum swings in the plane perpendicular to the longitudinal central axis of the chuck body 0. In the third embodiment according to the present invention, said drive pendulum (331) swings in a vertical plane parallel with the longitudinal central axis.

Figure 21:
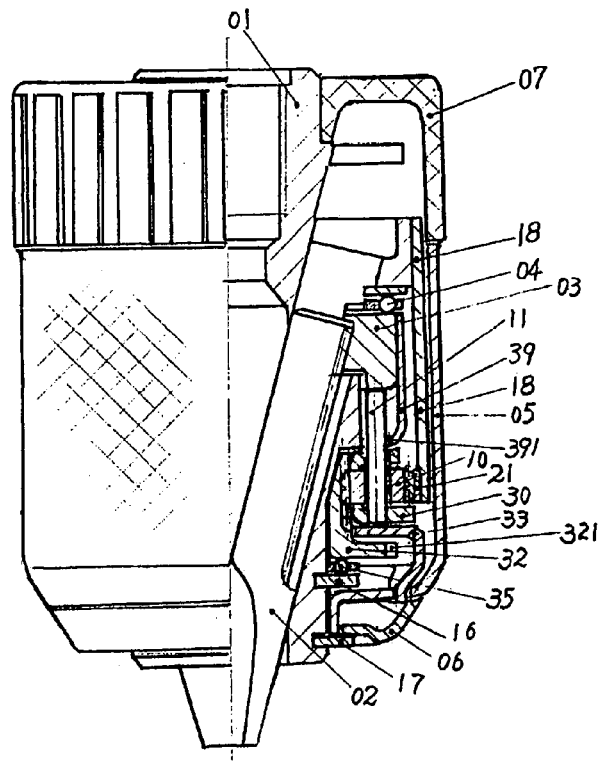
FIG. 21 is a front cross sectional view of the chuck according to the third embodiment of the present invention.

FIG. 21 is the front cross sectional view of the chuck according to the third embodiment of the present invention. Referring to FIG. 21, the chuck comprises an outer sleeve 05, a nut sleeve 39, a transmission sleeve 30, a gear sleeve 32 and a drive pendulum support sleeve 33.

Figure 29:
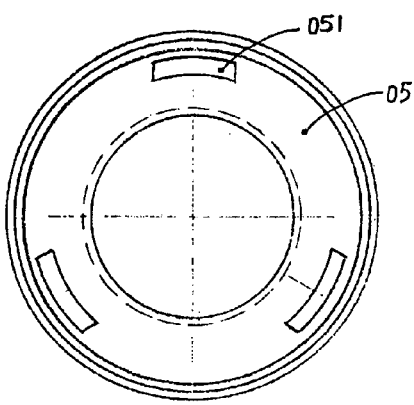
FIG. 29 is a top view of the outer sleeve in FIG. 21.

Referring to FIG. 29, the top view of the outer sleeve 05 is shown. The outer sleeve is connected at its lower end to a front cover 06 and has plural slots 051.

Figure 26:
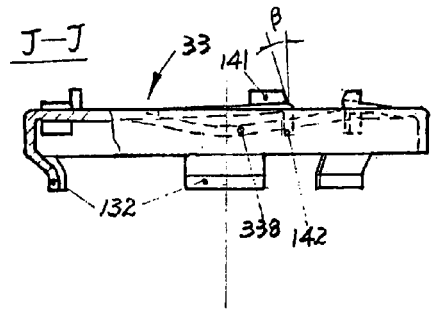
FIG. 26 is a front cross sectional view of the drive pendulum support sleeve in FIG. 21.
Figure 27:
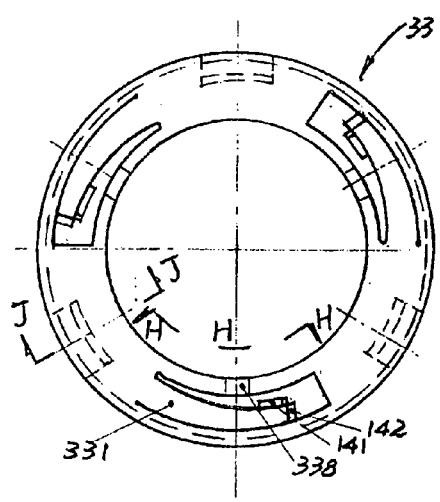
FIG. 27 is a top view of the drive pendulum support sleeve in FIG. 26.
Figure 28:
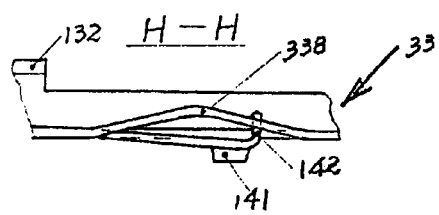
FIG. 28 is a partial enlarged view of FIG. 27 along line H-H.

Referring to FIGS. 26-28, the structure of the drive pendulum support sleeve 33 is shown. It can be found from the figures that the lower end of the drive pendulum support sleeve 33 has plural bearer keys 132 for cooperating with the slots 051 of the outer sleeve 05, such that the drive pendulum support sleeve 33 is driven by rotating the outer sleeve 05. The difference of this embodiment from the first and second embodiments is that the drive pendulum 331 in the present embodiment is an elastic portion integrated with the drive pendulum support sleeve 33 into one-piece member. It can be seen from FIG. 27 that the drive pendulum support sleeve 33 has three drive pendulums 331.

The drive pendulums 331 are formed by cutting the top surface of the drive pendulum support sleeve 33 circumferentially. Each drive pendulum 331 has at its free end a first drive key 141 formed by bending upward and a second drive key 142 formed by bending downward. It can be seen from FIG. 26 that each of the first drive keys 141 has a side surface as an inclined surface for engaging with the drive notch 092 of the transmission sleeve 30.

An elastic support portion 338 is formed on a constant portion at the inner side of each drive pendulum 331 in radial direction. The central part of the elastic support portion 338 is bent downward and extended to form the supporting. The elastic support portion (338) is abutting against the top surface of a position stop plate 323 (described later) of the gear sleeve 32, for moving axially the drive pendulum support sleeve 33 upward with respect to the gear sleeve 32 and restoring it.

Figure 24:
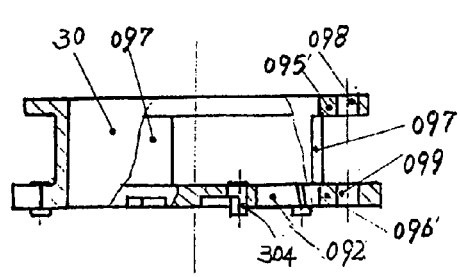
FIG. 24 is a front cross sectional view of the transmission sleeve in FIG. 21.
Figure 25:
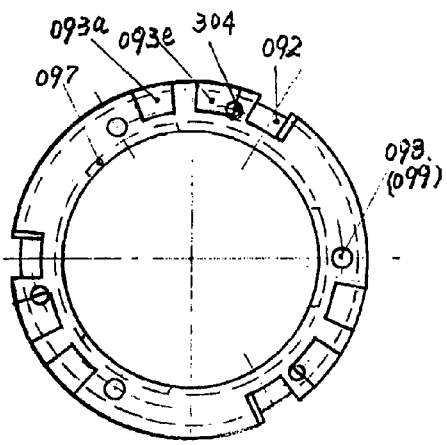
FIG. 25 is a bottom view of the transmission sleeve in FIG. 24.

Referring to FIGS. 24 and 25, the structure of the transmission sleeve 30 is shown. The transmission sleeve 30 has the drive notch 092 at its lower end. The transmission sleeve 30 have at its upper and lower ends flanges 095' and 096' respectively, in which shaft mounting holes 098 and 099 are formed respectively, for mounting the planet gear shaft 11. Referring to FIG. 21 again, the planet gear shaft 11 is mounted with the planet gear 10 which is located between the flanges 095 and 096. The planet gear shaft 011 extends upward to the proximity of the bottom surface of the nut 03 and extends downward to the proximity of the top surface of the drive pendulum support sleeve 33, so as to limit the axial position of the planet gear shaft 011 to prevent the planet gear shaft (011) from moving back and forth in axial direction.

Referring to FIGS. 24 and 25, the transmission sleeve 30 is provided with a planet gear window 097 thereon located at a position corresponding to the planet gear 10 in FIG. 21. The planet gear shaft 11 is mounted on the outer side of the transmission sleeve 30 and the planet gear 10 is made to partially pass through the window 097 to engage with the first gear teeth portion 121 of the gear sleeve 32.

The transmission sleeve 30 is provided at its bottom surface with one or more position grooves 093a and 0933e. The first drive key 141 can slide into the position grooves 093 and 093e when the drive pendulum 331 in the second position drives the gear sleeve 32 to rotate.

The transmission sleeve 30 is also provided with a stop portion 304 located between the position groove 093e and the drive notch 092, preferably, located at the abutment position of the position groove 093e for preventing the first drive key 141 of the drive pendulum 331 from passing over the position groove 093e and entering the drive notch 092 during the gripping of the chuck. The stop portion 304 may be a stop structure integrally formed with the transmission sleeve 30 or provided on a position pin mounted on the transmission sleeve 30.

Figure 23:
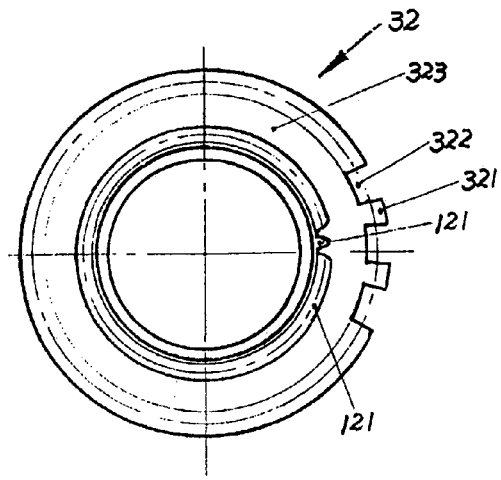
FIG. 23 is a top view of the gear sleeve in FIG. 21.

As shown in FIG. 21, the gear sleeve 32, fitted around the chuck body 01, has the first gear teeth portion 121 and the second gear teeth portion 321. Referring to FIG. 23 at the same time, the gear sleeve 32 is formed at its lower end with a position stop plate 323 for supporting axially the drive pendulum support sleeve 33. The second gear teeth portion 321 is formed at the outer periphery of the position stop plate 323.

The first gear teeth portion 121 is located at a position corresponding radially to the planet gear 10 and engages with it, while the second gear teeth portion 321 is located below the second drive key 142 of the drive pendulum 331 in axial direction and engages with it. The teeth of the first gear teeth portion 121 are typical gear teeth and have a relatively dynamic transmission relationship with the planet gear in operation, while the teeth of the second gear teeth portion 321 are used as connection points functioning as keys and have a relatively static drive relationship with the second drive key 142 in operation.

Figure 22:
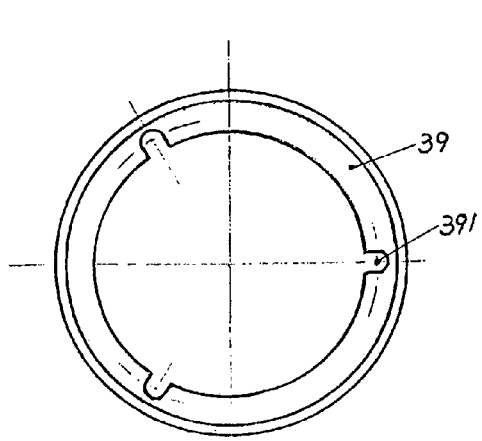
FIG. 22 is a top view of the nut sleeve in FIG. 21.

The nut sleeve 39 and the transmission sleeve 30 are connected with each other, equivalent to the nut transmission sleeve in the first embodiment. Referring to FIG. 22, the top view of the nut sleeve is shown. The nut sleeve 39 is fixedly connected on the transmission nut 03 at its upper end and forms a notch 391 in the inner side of the lower end. The notch is used for the passing through the planet gear shaft 32, so as to be connected together with the transmission sleeve 30 supporting and mounting the planet gear shaft 32. Alternatively, the nut sleeve 39 and the transmission sleeve 30 may also be integrally formed.

In addition, the chuck body 01 is mounted with a spring check ring 16. The spring check ring 16 is located in front of the gear sleeve 32 with an anti-friction assembly 35 therebetween. The anti-friction assembly may be a plane rolling bearing or other anti-friction structures made of the materials with low friction coefficient such as oil-free lubrication structure.

The operation procedure of the chuck of the third embodiment will be described in conjunction with figures hereinafter.

Referring FIG. 21, when the outer sleeve 05 is rotated, the slot 051 in the outer sleeve 05 engages with the bearer key 132 on the drive pendulum support sleeve 33, pushing the drive pendulum support sleeve 33 to rotate. The first drive key 141 of the drive pendulum 331 on the drive pendulum support sleeve 33 engages with the drive notch 092 of the transmission sleeve 30, such that the transmission sleeve 30, along with the nut 03, are rotating with the outer sleeve 05 in the same direction. The thread transmission between the nut and the jaws makes the jaws move back and forth in the inclined holes in the chuck body to grip or release the drill handle. The positive rotation of the outer sleeve 05 makes the jaws 2 move forward and grip the drill handle.

This is the first stage of gripping in which the transmission path is the first path. The maximum rotating torque N1 of the first stage can be set by appropriate selection of the magnitudes of the elastic force of the drive pendulum 331 and the angle β (<90°) of the inclined surface.

If the outer sleeve is further rotated with greater force, once the rotating torque is greater than N1, the inclined surface of the first drive key 141 of the drive pendulum 331 slides with respect to the corresponding side wall of the notch 092 and at the same time, the drive pendulum 331 swings about its connection portion on the drive pendulum support sleeve 33 in the vertical plane parallel with the central axis, which makes the first drive key 141 slide out from the notch 092 and contact with the bottom surface of the transmission sleeve 30. Then, the second drive key 142 moves downward to engage with the second gear teeth portion 122 of the gear sleeve 32 therebelow, and then the second stage of gripping is entered in which the passed transmission path is the second path.

In the second stage of gripping, the rotating torque is magnified through the transmission of a planet gear. In this stage, the input torque of the outer sleeve 05 is applied to push the drive pendulum support sleeve 33 through the slot 051 and the second drive key 142 of the drive pendulum 331 enters the notch 322 in the second gear teeth portion 122 of the gear sleeve 32, bringing the gear sleeve 32 to rotate about the chuck body 01. Since the planet gear 10 engages with the first gear teeth portion 121 of the gear sleeve 32 and the inner teething-ring 21 of the teething-ring connection sleeve 18 simultaneously, the planet gear 10, the planet gear shaft 11 and the transmission sleeve 30 are rotating about the chuck body 01 together and drive the nut 03 to rotate through the transmission sleeve 30, and further gripping is conducted.

According to the magnitude of the gripping force in design, the transmission sleeve 30 is, along the path in which the first drive key 141 of the drive pendulum 331 slides, provided at its lower surface with plural position grooves 093a-093e. The gripping forces corresponding to the position grooves 093a-093e are sequentially increased along the circumferential direction. When the first drive key 141 slides into the corresponding position groove (the second drive key 142 is still engaging with the second gear teeth portion 321 of the gear sleeve 32 at this point), the drill handle is applied by the gripping force which is substantially corresponding to that of the designed position. Additionally, when the first drive key 141 is located in one corresponding groove of the grooves 093a-093e, it can prevent the release of the tool handle due to the reverse rotation of the nut under an operating condition of vibration and impact.

When the tool handle is released, firstly, a relatively greater force is reversely exerted on the outer sleeve 05, making the first drive key 141 slide out from the position groove. Then the outer sleeve is further rotated to a position where the first drive key 141 is corresponding to the drive notch 092. At this point, under the effect of the elastic force of the elastic support portion 338, the drive pendulum 331 swings upward, the second drive key 142 disengages from the second gear teeth portion 321, and the first drive key 141 enters the notch 092. Herein, the tool handle can be released quickly by the constant and reverse rotation of the outer sleeve.

The Fourth Embodiment

Figure 30:
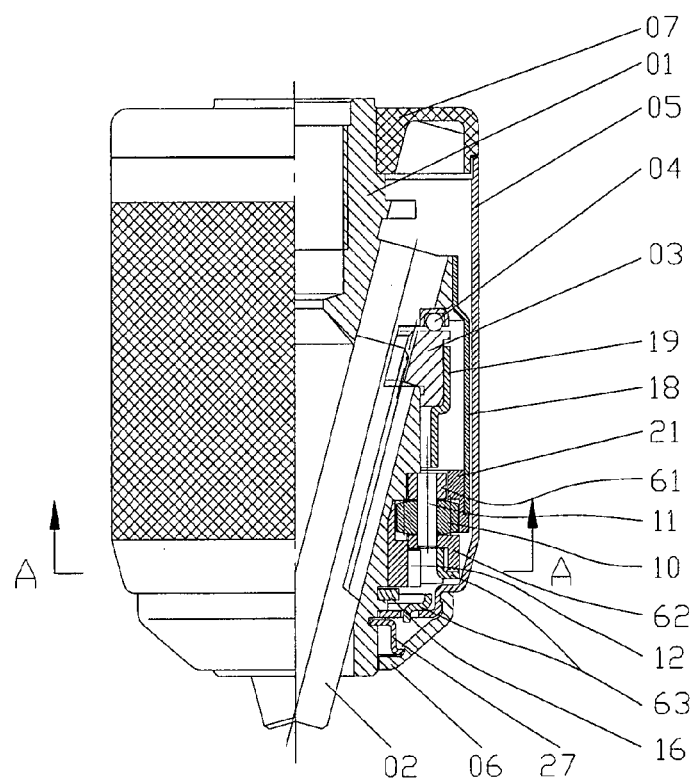
FIG. 30 is a front cross sectional view of the chuck according to the fourth embodiment of the present invention.

Referring to FIG. 30, the front cross sectional view of the chuck according to the fourth embodiment of the present invention is shown. Also referring to FIG. 33, the exploded perspective view of the chuck according to the fourth embodiment of the present invention is shown.

Figure 33:
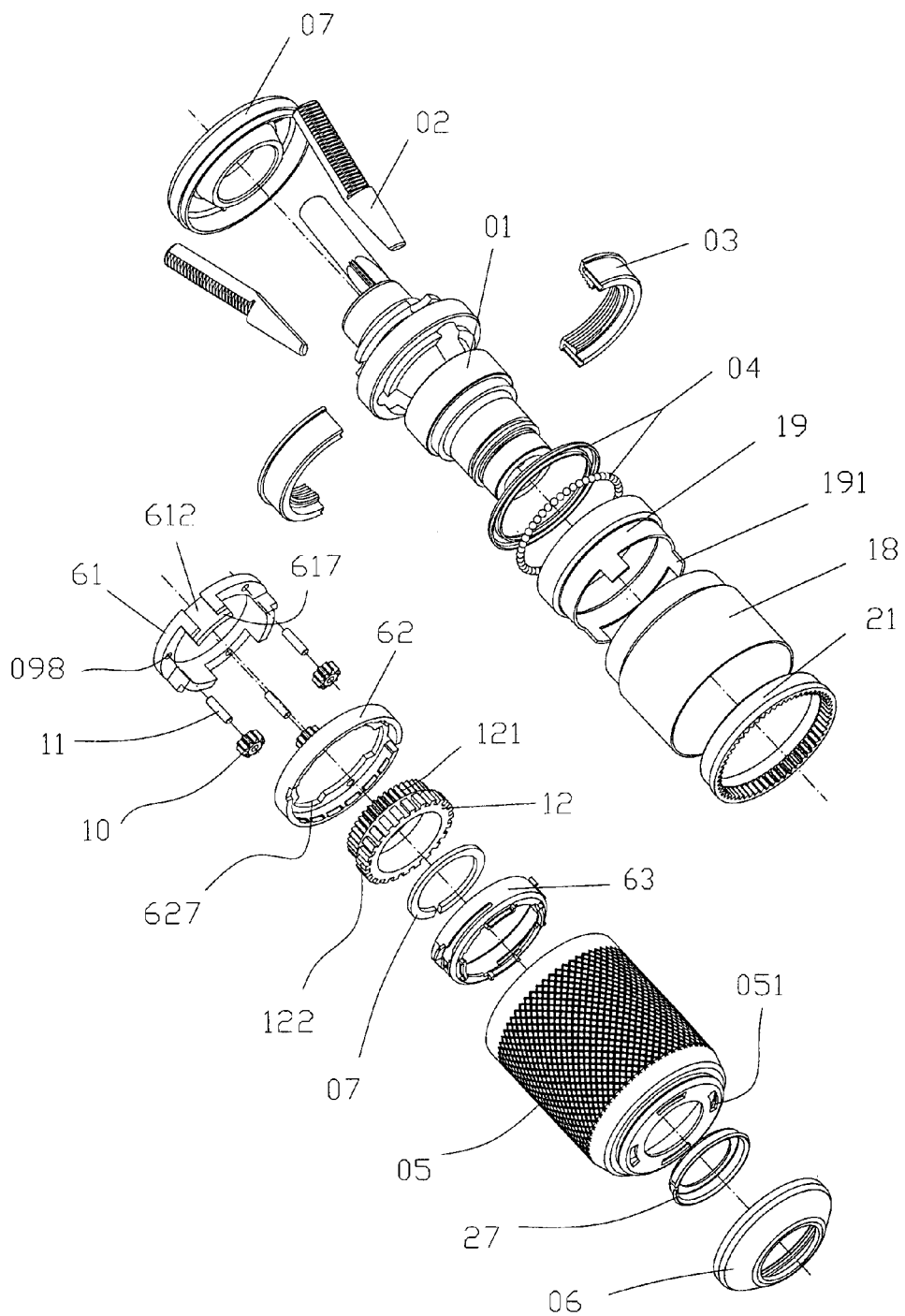
FIG. 33 is an exploded perspective view of the chuck according to the fourth embodiment of the present invention, and the view of the chuck according to the fifth embodiment of the present invention can also refers to this FIG. 33.
Figure 34:
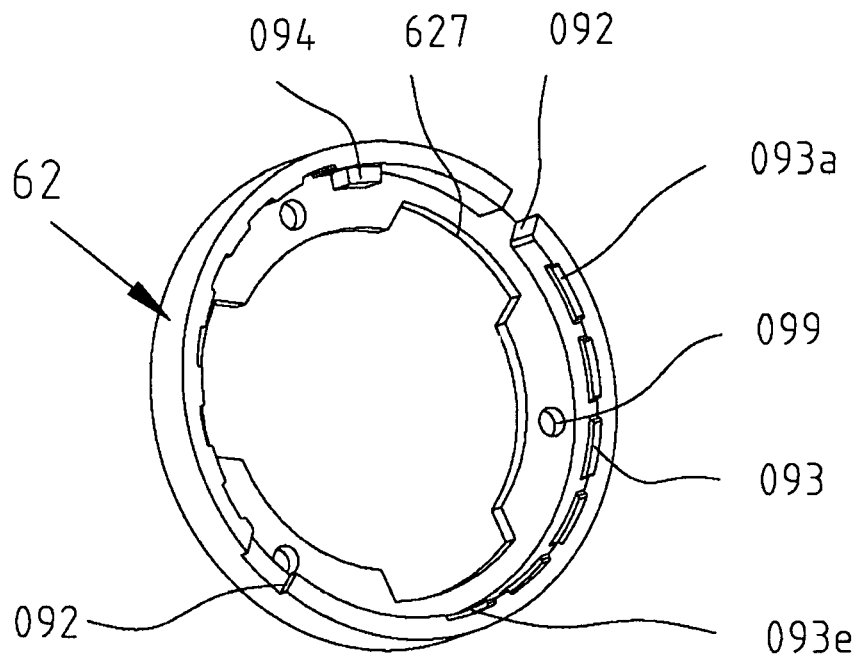
FIG. 34 is a perspective view of a second gear bracket in FIG. 30.

In fourth embodiment, the combination of the nut sleeve 19, the first gear bracket 61 and the second gear bracket 62 is used to replace the nut transmission sleeve 09 in a form of one-piece member in the first embodiment. The structures of the nut sleeve 19, the first gear bracket 61 and the second gear bracket 62 are shown in FIG. 33 and the structure of the second gear bracket 62 is also shown in FIG. 34.

The nut sleeve 19 is fixedly fitted around the transmission nut 03 at its upper portion and forms a drive key 193 at its lower portion.

The first gear bracket 61 exhibits a substantially ring shape, wherein plural shaft mounting holes 098 are equally arranged about the central axis, the first gear bracket 61 is formed with a key groove 612 on its outer periphery corresponding to the drive key 193 of the nut sleeve 19, and a connecting key 617 is formed on its lower portion corresponding to the key groove 612. The first gear bracket 61 is fixedly connected with the nut sleeve 19 by connecting insertedly the drive key 193 into the key groove 612.

The second gear bracket 62 exhibits a substantially ring shape, wherein a connecting notch 627 is provided at a position corresponding to the connecting key 617, plural shaft mounting holes 099 are equally arranged about the central axis at the upper portion, and a drive notch 092 and a position groove 093 are provided at the lower portion with the position groove 093 including the position grooves 093a-093e. The first gear bracket 61 is fixedly connected with the second gear bracket 62 through the connecting key 617 and the connecting notch 627.

In addition, in the fourth embodiment, the assembly of the teething-ring sleeve 18 and the inner teething-ring 21 replaces the teething-ring connection sleeve 08 of the first embodiment to fulfill the function of the latter.

The teething-ring sleeve 18 is fixedly fitted around the bearer stage 012 of the chuck body 01. The inner teething-ring 21 has a stop at the outer periphery of its upper end and an inner teething-ring portion at the inner wall of its lower end. The stop portion of the inner teething-ring 21 is pressed into the teething-ring sleeve 18 to form interference connection. The planet gear 10 is mounted on the planet gear shaft 11 on the first gear bracket 61 and the second gear bracket 62, and engages with both the first gear teeth portion 121 of the gear sleeve 12 and the teeth portion of the inner teething-ring 21.

Figure 35:
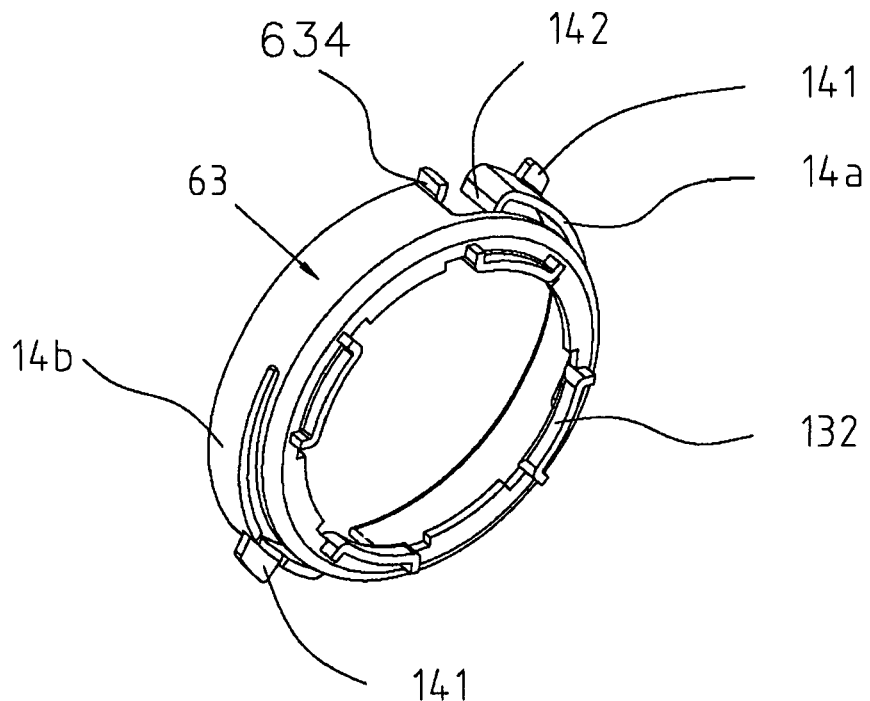
FIG. 35 is a perspective view of the drive pendulum support sleeve in FIG. 30.

Also, referring to FIG. 35, in the fourth embodiment, the drive pendulum support sleeve 63 is used to replace the combination of the drive pendulum shaft 15, the drive pendulum 14a, 14b and the elastic element 131 in the first embodiment.

The drive pendulum support sleeve 63 has plural drive pendulums 14a, 14b. The drive pendulum has the first drive key 141 bending toward the outside of the periphery and the second drive key 142 bending toward the inside of the periphery. The drive pendulums 14a, 14b are the elastic portions on the drive pendulum support sleeve 63, and are integrally made with the drive pendulum support sleeve 63 only at the end opposite to the second drive key 142. A stop key 634 is formed on the drive support sleeve 63 at the position opposite to the second drive key 142. The bearer key 132 is connected insertedly with the outer sleeve 05, connecting the drive pendulum support sleeve 63 with the outer sleeve 05.

In addition, the side surface of the first drive key 141, which engages with the drive notch 092 of the second gear bracket 62 along the rotating direction of gripping, is inclined. The angle between the inclined surface and the circumferential tangent line of the drive pendulum is $\beta$ (<90°). Correspondingly, the side surface of the drive notch 092 engaging with the inclined surface of the second drive key 142 is inclined and the angle between the inclined surface of the drive notch 092 and the circumferential tangent line of the second gear bracket 62 is $\beta$ (<90°).

Figures 31, 32:
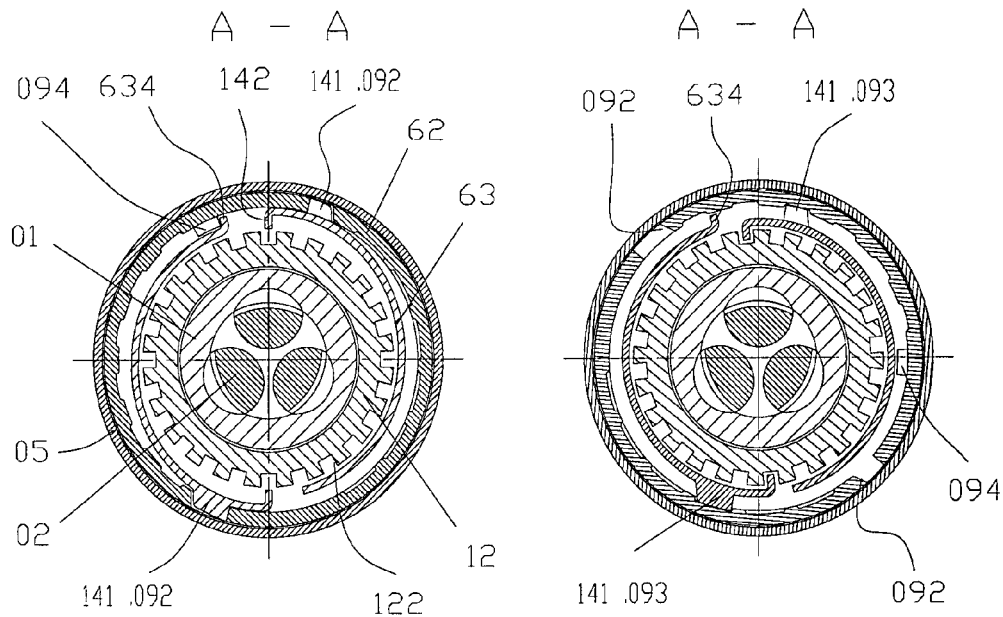
FIG. 31 is a cross sectional view taken along the line A-A of the FIG. 30, wherein the chuck is in the first stage of gripping while the drive pendulum is in the first position.
FIG. 32 is a cross sectional view taken alone the line A-A of FIG. 30, wherein the chuck is in the second stage of gripping while the drive pendulum is in the second position.

In the assembly position, referring to FIGS. 31-32, the first drive key 141 of the drive pendulum 14a, 14b engages with the drive notch 092 of the second gear bracket 62 and the drive pendulum is in the first position at this point. The angle between the inclined side surface of the first drive key 141 far from the second drive key 142 and the circumferential tangent line is $\beta$ (<90°), therefore when the first drive key 141 engages with the drive notch 092 and drives the second gear bracket 62, the side surface of the drive notch 092 contacting the first drive key 141 applies an inward component force in radial direction on the drive pendulum 14a, 14b, such that the first drive key 141 disengages from the drive notch 092 and the second drive key 142 engages with the second gear teeth portion 122 of the gear sleeve 12. At this point, the drive pendulum is in the second position.

The second gear bracket 62 is provided with the stop portion 094 which is located on the side wall portion between the position groove (093e) and the drive notch 092 and protrudes inward in radial direction to prevent the first drive key 141 of the drive pendulum 14a, 14b from passing over the position groove 093a, 093e and entering the drive notch 092 during the gripping. If said situation comes true, the second drive key 142 will disengage from the second gear teeth portion 122 of the gear sleeve 12 due to the elastic effort of the drive pendulum 14a, 14b themselves.

In the fourth embodiment, a holding member 27 is used to replace the spring stop ring 17 in the first embodiment to fulfill the function of the latter. The holding member 27 has an opening and cooperates respectively with the drill body 01 and the front cover 06 at its upper and lower ends to connect the two together.

Hereafter, the operating process of the fourth embodiment will be described in detail in conjunction with figures.

Referring to FIGS. 30-35, the outer sleeve 05 is rotated in clockwise direction in FIG. 31, such that the slot 051 urges the drive pendulum support sleeve 63 to rotate, and under the elastic effect of the drive pendulum 14 on the drive pendulum support sleeve 63 itself, the first drive key 141 of the drive pendulum 14 engages with the drive notch 092 of the second gear bracket 62. Because of the fixed connections between the first gear bracket 61, the second gear bracket 62 and the nut sleeve 19, the nut sleeve 19 along with the nut 03 is rotated with the outer sleeve 05 together in the same direction and the thread transmission between the nut thread and the jaws makes the jaws move back and forth in the inclined holes for gripping or releasing the drill handle. The positive rotation of the outer sleeve 05 makes the jaws 02 move forth and grip the drill handle.

This is the first stage of gripping, wherein the transmission path is the first path. The Maximum rotating torque N1 in the first stage can be set through the appropriate setup of the engaging position and the magnitude of β (<90°) between the drive pendulum and the drive pendulum support sleeve.

If the outer sleeve is rotated further with greater force, when the rotating torque is greater than N1, because the counterforce of the side wall of the second gear bracket 62 applied to the inclined side surface of the first drive key 141 has an inward component force in radial direction, the drive pendulum 14 swings about the drive pendulum support sleeve 63 by overcoming the elastic force of itself and the friction between the first drive key 141 and the notch 092, such that the first drive key 141 slides out from the notch 092 and is supported by the second gear bracket 62, forcing the second drive key 142 to engage with the second gear teeth portion 122 of the gear sleeve 12. The second stage is entered in which the passed transmission path is the second path.

In the second stage of gripping, the rotating torque is magnified by the transmission of a planet gear mechanism, i.e., the input torque of the outer sleeve 05 is magnified. The slot 051 pushes the drive pendulum support sleeve 63, and the swinging of the drive pendulums 14a, 14b makes the second drive key 142 engage with the drive gear teeth 122 of the gear sleeve 12, and brings the gear sleeve 12 to rotate. Because of the key-groove connection between the first gear bracket 61, the second gear bracket 62 and the nut sleeve 19 and because of the fixed connection between the teething-ring sleeve 18 and the chuck body 01, the planet gear 10 brings simultaneously the first gear bracket 61, the second gear bracket 62 and the nut sleeve 19 along with the nut 03 to rotate about the chuck body 01 with the outer sleeve 05 together, urging the jaws 02 to move forth and grip the drill handle.

Since the torque is magnified by i times from the gear sleeve 12 to the nut 03 through the transmission of the planet gear mechanism (the transmission ratio i>1 from the nut sleeve 19 to the gear sleeve 12), the torque applied to the nut 02 is approximately i times of the torque input by the outer sleeve. Therefore, the gripping force of the jaws 02 applied to the drill handle is approximately i times of the gripping force provided by conventional chucks.

Depending on the magnitude of the gripping force in design, the inner side surface of the second gear bracket 62 is further provided with plural position grooves 093a-093e along the sliding path of the first drive key of the drive pendulum 14. The gripping forces corresponding to the position grooves 093a-093e are sequentially increased along the circumferential direction. When the first drive key 141 slides into the corresponding position groove (the second drive key 142 is still engaging with the second gear teeth portion 122 at this point), the drill handle is applied with the gripping force substantially corresponding to that of the designed position. Meanwhile, the first drive key 141 located in a corresponding position groove of the position grooves 093a-093e also can, under the operation condition of vibration and impact, prevent the release of the tool handle due to the reverse rotation of the nut.

The operating process of releasing the tool handle is same as that of the first embodiment, so the related description is omitted.

The Fifth Embodiment

The differences between the fifth and fourth embodiments are as follows. The structures and functions of the drive pendulum support sleeve 63' of the fifth embodiment are exploded and substituted by the combination of the drive pendulum support sleeve 63' and the drive pendulum 65a, 65b. The rest structures and functions of the fifth embodiment are the same as those in the fourth embodiment.

Thus, the front cross sectional view of the chuck of the fifth embodiment is not shown separately. The position relationship between related various components of the fourth embodiment as shown in FIG. 30 can be referred to for the fifth embodiment. The particular structures can be learned through referring to the structural perspective view of the drive pendulum shown in FIGS. 36 and 37 as well as the cross sectional view taken along the line A-A in FIGS. 38 and 39.

Figure 36:
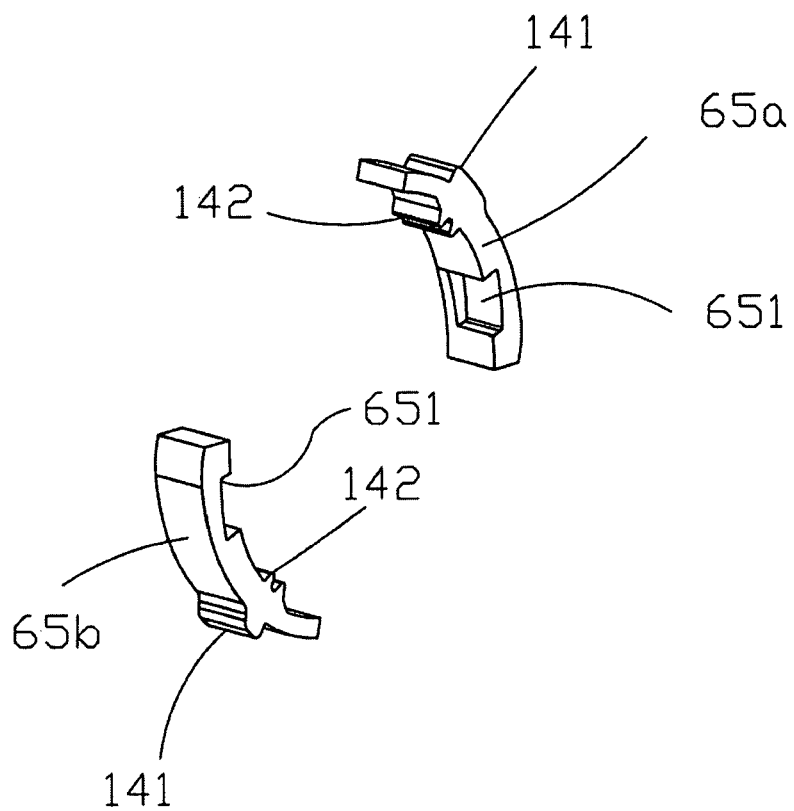
FIG. 36 is a perspective view of the chuck according to the fifth embodiment of the present invention.
Figure 37:
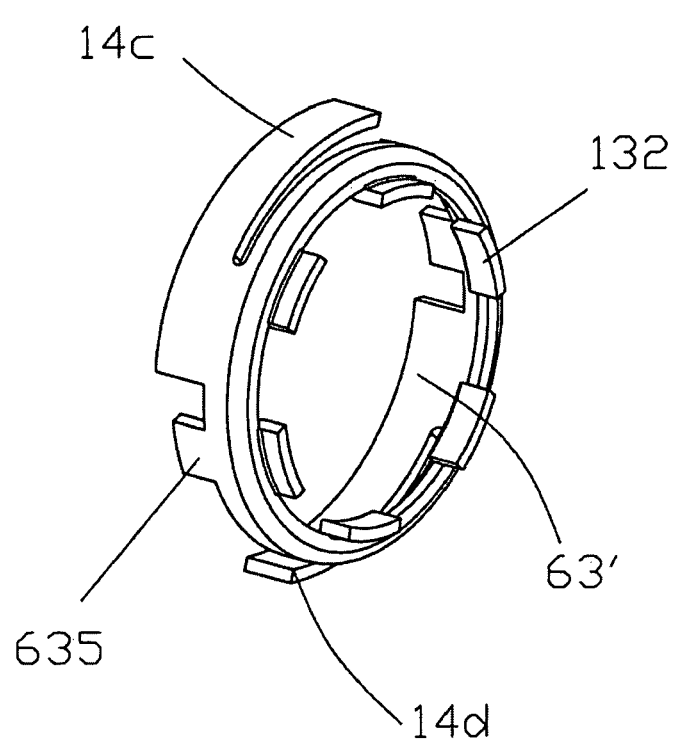
FIG. 37 is a perspective view of the drive pendulum support sleeve of the chuck of the fifth embodiment.

FIG. 36 shows two corresponding drive pendulums 65a and 65b which are to be mounted on the drive pendulum support sleeve 63'. The individual drive pendulum further has the connecting groove 651 besides the first drive key 141 provided on its outer side and the second drive key 142 provided on its inner side. FIG. 37 shows the drive pendulum support sleeve 63' with two connecting keys 635 and two elastic portions 14c, 14d thereon, wherein the two connecting keys 635 are connected with the connecting groove 651 of the two drive pendulums respectively and the two elastic portions 14c, 14d have a connect end and a free end respectively. Meanwhile, as shown in FIGS. 38 and 39, the connect end of each of elastic portions 14c and 14d is correspondingly located at the proximity of one connecting key 635, while the free end of each elastic portion, in the state of assembly, biases the free end of another adjacent drive pendulum toward the outside.

The operating process of the fifth embodiment will be described in detail below in conjunction with figures.

Figure 38:
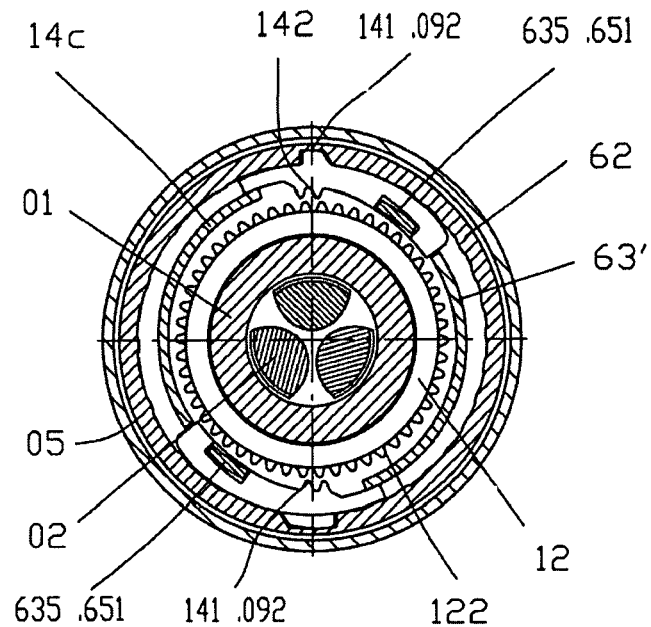
FIG. 38 is a cross sectional view of the fifth embodiment of the present invention taken along the line A-A of FIG. 30, wherein the chuck is in the first stage of gripping and the drive pendulum is in the first position.
Figure 39:
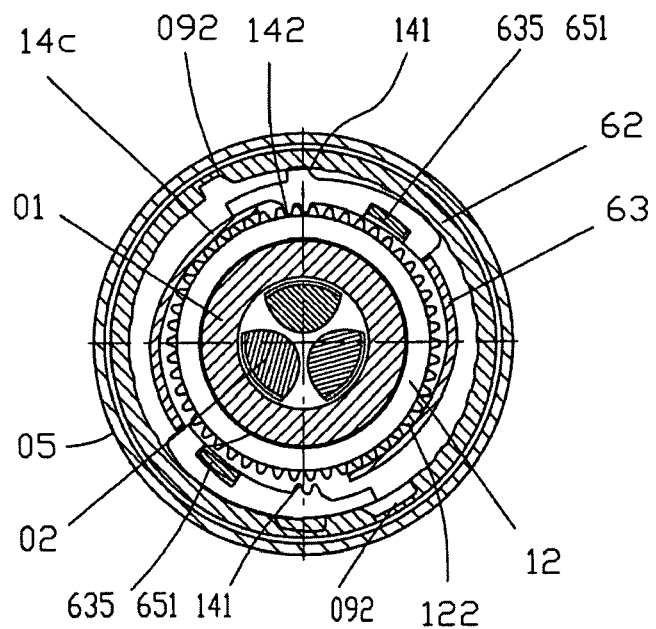
FIG. 39 is a cross sectional view of the fifth embodiment of the present invention taken along the line A-A in FIG. 30, wherein the chuck is in the second stage of gripping and the drive pendulum is in the second position.

Referring to FIG. 38, the outer sleeve 05 is rotated in clockwise direction in FIG. 38, such that the drive pendulum support sleeve 63' is rotated with the outer sleeve 05 and the two drive pendulums are urged to rotate through the cooperation between the connecting key 635 of the drive pendulum support sleeve and the connecting groove 651 of the drive pendulum 65a, 65b. Biased by the elastic portions 14c and 14d on the drive pendulum support sleeve, the first drive key 141 on the drive pendulum 65a, 65b engages with the drive notch 092 of the second gear bracket 62, so as to bring the jaws 02 to move forth and grip the drill handle, which is the same as that in the fourth embodiment. This is the first stage of gripping, wherein the transmission path is the first path.

If the outer sleeve is further rotated with greater force, the drive pendulums 65a, 65b respectively overcome the biased force of the elastic portions 14c and 14d so that their first drive key 141 slides out from the notch 092 and the second drive key 142 engages with the second gear teeth portion 122 of the gear sleeve 12 respectively. The second stage is entered in which the transmission path is the second path.

The present invention has been described in detail in conjunction with several embodiments. In understanding the scope of the present invention, the term "include" and its derivations are expandable, and express features, elements, components, groups, integers, and/or steps to be presented but do not exclude other features, elements, components, groups, integers, and/or steps not presented. The above statement is also applicable for the terms with similar meanings, such as "comprise", "have" and their derivations. Terms "connection" and the like include direct and/or indirect connections except unless otherwise specified. Based on the general understanding of those skilled in the art, two or more components fixedly connected may be integrally made to one-piece member, and vice versa, and for the structures by the cooperation between two components, for example, positions of a key and a groove can be exchanged, all these common replacements of technical means are deemed as equivalent technical solutions.

While the preferable embodiments of the present invention has been disclosed for the purpose of description, it will be apparent to those skilled in the art that various changes and modifications may be made therein without departing from the spirit and scope of the invention. Thus, it is intended that the present invention covers the modifications and variations of this invention that come within the scope of the appended claims and their equivalents.

The invention claimed is:

1. A chuck provided on a transmission shaft driven by a power source, the chuck comprising:
    a chuck body having a longitudinal central axis and connected at its rear end to the transmission shaft to drive the chuck body to rotate about the central axis, wherein plural inclined holes are equally arranged in the chuck body;
    plural jaws provided in the inclined holes of the chuck body, wherein each of the jaws has male thread at its rear end and a gripping portion at its front end, and slides back and forth along the inclined hole through thread transmission so as to grip or release a tool handle;
    an outer sleeve rotatably fitted around the chuck body; and
    a transmission nut fitted around the chuck body and indirectly connected to the outer sleeve, wherein the outer sleeve can be rotated to drive the transmission nut, on the inner surface of which female thread is formed which engages with the male thread of the jaws to drive the jaws;
    characterized in that the chuck further comprises:
    a drive pendulum support sleeve, located between the outer sleeve and the transmission nut, connected to the outer sleeve and fitted around the chuck body;
    a drive pendulum, provided on the drive pendulum support sleeve, swinging between a first position and a second position about a connection portion where the drive pendulum and the drive pendulum support sleeve are connected, and having a first drive portion and a second drive portion thereon, wherein the drive pendulum drives the transmission nut along a first transmission path through the first drive portion when it is in the first position while drives the transmission nut along a second transmission path through the second drive portion when it is in the second position with the second driving path providing greater gripping force than that of the first driving path.

2. The chuck according to claim 1, characterized in that the first or second drive portion is a first or second drive key respectively and the drive pendulum swings in a plane perpendicular to the longitudinal central axis.

3. The chuck according to claim 2, characterized in further comprising a nut transmission sleeve which is fixedly connected at its upper end to the transmission nut and provided at its lower end with a drive notch, wherein when the drive pendulum is at the first position, the first drive key of the drive pendulum is connected drivable with the drive notch of the nut transmission sleeve, such that the drive pendulum drives the transmission nut along the first path.

4. The chuck according to claim 3, characterized in that the side surface of the first drive key, which engages with the drive notch of the nut transmission sleeve in a gripping rotating direction, is inclined, such that the corresponding side surface of the drive notch exerts a component force toward the second position on the drive pendulum when the first drive key engages with the drive notch to drive the nut transmission sleeve.

5. The chuck according to claim 4, further comprising:
    a gear sleeve fitted between the chuck body and the drive pendulum support sleeve and having a first gear teeth portion and a second gear teeth portion;
    a teething-ring connection sleeve fixedly connected at one end to the chuck body and having an inner teething-ring portion at the other end with the inner teething-ring portion having inner gear teeth thereon;
    at least one planet gear rotatablely provided on the nut transmission sleeve, located between the first gear teeth portion of the gear sleeve and the inner teething-ring portion of the teething-ring connection sleeve and engaging with the first gear teeth portion and the inner teething-ring portion respectively;
    wherein when the drive pendulum is at the second position, the second drive key engages with the second gear teeth portion of the gear sleeve, such that the drive pendulum drives the transmission nut along the second path.

6. The chuck according to claim 5, characterized in that the drive pendulum support sleeve is provided with a window at the position corresponding to the second drive key of the drive pendulum, and when the drive pendulum is at the second position, the second drive key extends inward in radial direction, and then engages with the second gear teeth portion of the gear sleeve.

7. The chuck according to claim 6, characterized in that the drive pendulum support sleeve is provided with an elastic portion, which abuts against the inner side of the drive pendulum to bias the drive pendulum outward in radial direction.

8. The chuck according to claim 5, characterized in that the nut transmission sleeve is provided with at least a pair of shaft support arms having shaft mounting holes therein, wherein the shaft mounting holes are mounted therein with a planet gear shaft on which the planet gear is mounted, and the planet gear is located between the shaft support arms.

9. The chuck according to claim 8, characterized in that a planet gear window is provided on the nut transmission sleeve at the position corresponding to the planet gear, and the planet gear shaft is mounted on the inner side of the nut transmission sleeve such that the planet gear partially passes through the window to engage with the inner gear teeth on the inner teething-ring portion of the teething-ring connection sleeve.

10. The chuck according to claim 9, characterized in that a position stop plate is provided between the first gear teeth portion and the second gear teeth portion of the gear sleeve and extends in radial direction below the planet gear shaft to prevent the planet gear shaft from moving forward axially.

11. The chuck according to claim 5, characterized in that the nut transmission sleeve is provided at its inner surface with one or more position grooves such that the first drive key can slide into the position groove during the rotation of the gear sleeve driven by the drive pendulums in the second position.

12. The chuck according to claim 11, characterized in that a stop portion is provided on the nut transmission sleeve and located between the position groove and the drive notch to prevent the first drive key of the drive pendulum from passing over the position grooves and entering the drive notch during the gripping of the chuck.

13. The chuck according to claim 5, characterized in that the nut transmission sleeve includes a nut sleeve and a transmission sleeve which are provided separately and connected with each other.

14. The chuck according to claim 13, characterized in that the nut sleeve is fitted at its upper portion around the nut and provided at its lower portion with a notch, and the transmission sleeve is provided with an upper shaft support portion and a lower shaft support portion for mounting the planet gear shaft supporting the planet gear, wherein the upper shaft support portion is an upper shaft support arm which extends outward in radial direction and cooperates drivable with the drive notch on the nut sleeve.

15. The chuck according to claim 5, characterized in that the teething-ring connection sleeve includes a teething-ring sleeve and an inner teething-ring which are provided separately, wherein the teething-ring sleeve is fixedly mounted at its upper end on the chuck body and fixedly mounted at its lower end with the inner teething-ring at the position corresponding to the planet gear, and inner gear teeth are provided on the inner surface of the inner teething-ring.

16. The chuck according to claim 2, characterized in that the drive pendulum is integrally made at one end with the drive pendulum support sleeve and the other end of the same is a free end on which the first and second drive portions are formed.

17. The chuck according to claim 1, characterized in that the first or second drive portion is a first or second drive key respectively and the drive pendulum swings in the vertical plane parallel with the longitudinal central axis.

18. The chuck according to claim 17, further comprising a nut transmission sleeve which includes a nut sleeve and a transmission sleeve connected with each other, wherein the nut sleeve is fixedly connected at its upper end to the transmission nut and a drive notch is provided on the lower end of the transmission sleeve, such that the first drive key of the drive pendulum is connected drivable with the drive notch of the nut transmission sleeve when the drive pendulum is in the first position, thereby the drive pendulum driving the transmission nut along the first path.

19. The chuck according to claim 18, characterized in that the side surface of the first drive key of the drive pendulum, which engages with the drive notch of the nut transmission sleeve in the gripping rotating direction, is inclined, such that the corresponding side surface of the drive notch exerts an component force on the drive pendulum toward the second position when the first drive key engages with the drive notch and drives the nut transmission sleeve.

20. The chuck according to claim 19, further comprising:
a gear sleeve fitted between the chuck body and the drive pendulum support sleeve and having a first gear teeth portion and a second gear teeth portion;
a teething-ring connection sleeve fixedly connected to the chuck body at one end and having an inner teething-ring portion at the other end; and
at least one planet gear rotatablely provided on the transmission sleeve, and located between the first gear teething portion of the gear sleeve and the inner teething-ring portion of the teething-ring connection sleeve and engaging with the two respectively;
wherein when the drive pendulum is in the second position, the second drive key engages with the second gear teeth portion of the gear sleeve such that the drive pendulum drives the transmission nut along the second path.

21. The chuck according to claim 20, characterized in that the drive pendulum is the elastic portion formed integrally with the drive pendulum support sleeve and the drive pendulum support sleeve has at least one drive pendulum.

22. The chuck according to claim 21, characterized in that the free end of the drive pendulum has the first drive key formed by bending upwards and the second drive key formed by bending downwards.

23. The chuck according to claim 22, characterized in that the drive pendulum support sleeve also has at least one elastic support portion extending downward in axial direction which abuts one surface of the gear sleeve to make the drive pendulum support sleeve move upward in axial direction with respect to the gear sleeve and restore it.

24. The chuck according to claim 20, characterized in that flanges are provided on the upper and lower ends of the drive sleeve, respectively and have shaft mounting holes in which a planet gear shaft is mounted, and the planet gear is mounted on the planet gear shaft and located between the flanges.

25. The chuck according to claim 24, characterized in that the transmission sleeve is provided with a planet gear window at the position corresponding to the planet gear, and the planet gear shaft is mounted on the outer side of the drive sleeve such that the planet gear partially passes through the window to engage with the first gear teething portion of the gear sleeve.

26. The chuck according to claim 25, characterized in that the gear sleeve is formed at its lower end with a position stop plate for supporting the drive pendulum sleeve axially and the second gear teeth portion is formed on the outer periphery of the position stop plate.

27. The chuck according to claim 20, characterized in that one or more position grooves are also provided on the bottom surface of the transmission sleeve such that the first drive key can slide into the position groove during the rotation of the gear sleeve driven by the drive pendulum in the second position.

28. The chuck according to claim 27, characterized in that a stop portion is also provided on the drive sleeve and located between the position groove and the drive notch to prevent the first drive key of the drive pendulum from passing over the position grooves and entering the drive notch during the gripping of the chuck.

29. The chuck according to claim 18, characterized in that the nut sleeve and the transmission sleeve are made integrally as the nut transmission sleeve.

30. The chuck according to claim 1, characterized in that the drive pendulums are mounted detachably on the drive pendulum support sleeve, the first drive portion is a first drive key provided on the outer side of the drive pendulum, and the second drive portion is a second drive key provided on the inner side of the drive pendulum.

31. The chuck according to claim 30, characterized in that the drive pendulum has a connecting groove while the drive pendulum support sleeve has a connecting key connected with the connecting groove of the drive pendulum.

32. The chuck according to claim 30, characterized in that the drive pendulum support sleeve further has elastic portions, the free ends of which bias outward the free ends of the drive pendulum, respectively.

* * * * *